(12) United States Patent
Stollman

(10) Patent No.: US 12,169,834 B2
(45) Date of Patent: Dec. 17, 2024

(54) SYSTEMS AND METHODS FOR EXTENDING THE UTILITY OF BLOCKCHAINS THROUGH USE OF RELATED CHILD BLOCKCHAINS

(71) Applicant: Jeff Stollman, Wayne, PA (US)

(72) Inventor: Jeff Stollman, Wayne, PA (US)

(*) Notice: Subject to any disclaimer, the term of this patent is extended or adjusted under 35 U.S.C. 154(b) by 214 days.

(21) Appl. No.: 17/589,349

(22) Filed: Jan. 31, 2022

(65) Prior Publication Data
US 2022/0230169 A1 Jul. 21, 2022

Related U.S. Application Data

(63) Continuation-in-part of application No. 15/588,289, filed on May 5, 2017, now Pat. No. 11,240,035.

(51) Int. Cl.
*G06Q 20/40* (2012.01)
(52) U.S. Cl.
CPC .................. *G06Q 20/401* (2013.01)
(58) Field of Classification Search
CPC ................................................... G06Q 20/401
See application file for complete search history.

(56) References Cited

U.S. PATENT DOCUMENTS

| | | | |
|---|---|---|---|
| 8,751,863 B2* | 6/2014 | Calder | G06F 11/1662 714/6.3 |
| 2016/0330034 A1* | 11/2016 | Back | G06Q 20/065 |
| 2017/0075907 A1* | 3/2017 | Goswami | G06F 11/0751 |

* cited by examiner

*Primary Examiner* — John W Hayes
*Assistant Examiner* — Zehra Raza

(57) ABSTRACT

A system for extending the utility of blockchain environments when such environments become too large or complex, is disclosed. The system systematically creates a second generation, or child blockchain that can retain machine-readable links to the parent blockchain which, in turn, can be archived and referenced, when necessary, for historical reference. Accordingly, the system serves to reduce the size of the working blockchain thereby making it easier to store the blockchain, and further serves to increase the speed of queries to interrogate the current state of the blockchain. By reducing the size of the working blockchain, the present invention seeks to extend the utility of large blockchains by segregating and archiving historical or older transactions recorded in the blockchain. The system and process further include methodologies to create links between the current blockchain and the archived sections of the blockchain to ensure the integrity of the full historical ledger.

20 Claims, 19 Drawing Sheets

SYSTEMS AND METHODS FOR EXTENDING THE UTILITY OF BLOCKCHAINS THROUGH USE OF RELATED CHILD BLOCKCHAINS

CLAIM OF PRIORITY

This application claims the benefit of priority under 35 U.S.C. § 119(e) from U.S. patent application Ser. No. 15/588,289, filed on 5 May 2017, now allowed, and the contents of which are incorporated by reference herein in its entirety as if set forth in full.

FIELD OF THE INVENTION

The present invention generally relates to the field of information technology, with specific focus on blockchain technology. More particularly, the present invention relates to blockchain operation and architecture, and methods and systems for extending the utility of a blockchain by systematically creating one or more new "child" blockchains that are initiated using a "net" state of its predecessor or "parent" blockchain to reduce the size of the current operational blockchain. The new child blockchains may operate using different scope, policies and/or procedures than their parents. The "parent" blockchains can then be archived to preserve the full historical integrity of the complete blockchain ledger.

BACKGROUND DESCRIPTION AND REVIEW OF CERTAIN PRIOR ART

One objective of blockchain solutions is to maintain a live transaction ledger that includes a complete history of every transaction recorded on the system. An original design aspect of blockchains, and as many are currently implemented, the blockchain is a write-once record that is designed not to be altered, but only be appended to. Accordingly, as blocks are added to the blockchain, the size of, or required memory to store the blockchain continues to grow. Eventually, some blockchains may grow so large that their sheer size and memory requirements compromise their usefulness.

More particularly, as blockchain ledgers grow over time, their size imposes burdens on the underlying information technology system. First, larger blockchains may require more time to execute a query. Second, for systems that use "miners" to verify the integrity of new blocks added to the blockchain, the burden of simply storing large and growing blockchains on their systems may tax the capabilities of the miners' systems—adding costs or complexities. Further, for new miners, the act of bootstrapping the entire blockchain record to be used in the consensus calculations may become an unwieldy and cumbersome task.

Because blockchain technology is new, most blockchains are still relatively small. But they continue to grow as they are used and record additional transactions and blocks. For perpetual markets such as cryptocurrencies, the continued growth of such blockchains may eventually either reduce their performance to unacceptable levels or drive the cost of storage for those, such as miners, who store the databases locally, beyond supportable ranges. To date, an approach has not been posited to solve this impending cost and complexity problem. Accordingly, the opportunity is ripe for an innovative solution to this problem, and for such a new system.

Separately, as blockchain technology continues to evolve, it may be beneficial to make changes in the way a blockchain is implemented and operates. For example, it might be beneficial to change the validation technique (e.g., mining) to enhance throughput at different stages of the blockchain's life. This might also be done to save money, or to leverage a common set of procedures with one or more other blockchains. Another potential benefit is that the new blockchain may implement different policies than the original or parent blockchain. Such different policies may relate to new scope, block schema, or block size. This may be difficult to do with an existing blockchain, but could be facilitated by creating a new child blockchain using the disclosed methodologies.

Similarly, it may be found that there is a benefit to creating interoperability between two blockchains that operate differently. For example, the logistics industry may recognize significant economies for all parties if it is able to consolidate multiple supply-chain-integrity blockchains developed by different industries into a single blockchain system. By combining the net states (e.g., the current state of the latest values for all keys ever included in the chain transaction log) of each separate industry blockchain to create a new single common blockchain operating under a single set of policies with a single user interface, the logistics companies would likely need to support only a single system to support a diverse clientele.

Alternatively, it may be advantageous to separate two or more types of transactions into different blockchains. For example, if one set of transactions tracked a cryptocurrency and another set tracked the provenance of art work, separating the two would allow each blockchain to grow at a slower rate. And there would be no loss in value from separating them because there may be no substantive relation between the two types of transactions.

The subject invention targets these problems and issues. The present inventive systems and methodologies review the current blockchain to create a "net" state of the assets tracked in the ledger. The system then uses this net state as the basis for creating a new child or related blockchain. The system further creates appropriate links between the new blockchain and the parent blockchain to ensure complete historical integrity of the full combined blockchain ledger.

Examples exist of certain systems designed to address this problem. One such method and system is disclosed in U.S. patent application Ser. No. 15/150,032, for Transferring Ledger Assets Between Blockchains Via Pegged Sidechains, submitted by Back et al. (the "'032 application" or "Back et al."). The '032 application describes a process for transferring a single asset from a parent chain to a sidechain. The systems and methods disclosed relate specifically to a simplified payment-verification proof associated with the parent chain asset. More particularly, the described systems and methods in the '032 application appear to be limited to validation of a single parent chain asset thereby allowing for the creation of a corresponding sidechain asset. The '032 application does not disclose or suggest the creation of one or more entirely new child blockchains thereby allowing for the archiving of a related parent blockchain.

Another example of a related system is described in U.S. patent application Ser. No. 14/809,062, for a System and Method for Creating a Multi-Branched Blockchain with Configurable Protocol Rules, submitted by Spanos et al. (the "'062 application" or "Spanos et al."). Spanos et al. disclose an invention for creating a blockchain called a sidechain that allows for multiple valid branches or forks to propagate simultaneously with a customized set of protocol rules embedded in and applied to each fork chain that branches from another chain. What does not appear to be disclosed or suggested by Spanos et al. is any means for separating parent or predecessor blockchains for archiving purposes, or any means for linking any such separated parent blockchains to one or more new or subsequent child blockchains.

As described above, while systems have been created seeking to address the blockchain size and complexity problem, none appear to fully address all the related issues. Various embodiments of the current systems and methodologies disclosed herein provide a complete solution to the noted issues and problems.

SUMMARY OF THE INVENTION

The present invention overcomes the disadvantages of the prior art and fulfills the needs described above by providing systems and methods for creating child blockchains without sacrificing the cryptographic integrity of either the parent or child blockchains, thereby providing a means to reduce the size of the working blockchain, and extending the working life and utility of large blockchains.

A preferred embodiment of the invention is a method for extending the utility of an information-technology blockchain, said method comprising the steps of (a) establishing a transformation protocol including at least one of the following:
 i. at least one set of criteria for selecting a plurality of transactions ("selected transactions") from at least one information-technology blockchain ("parent blockchain"),
 ii. at least one set of criteria for identifying at least one destination information-technology blockchain ("child blockchain"),
 iii. at least one set of procedures for calculating a net state of said at least one parent blockchain;
 iv. at least one set of procedures for transforming said selected transactions to conform and be migrated to said at least one child blockchain,
 v. at least one set of procedures for creating at least one new block of transactions from said selected transactions to be migrated to said at least one child blockchain ("migration blocks"),
 vi. at least one set of procedures for validating any new blocks created for transformation to said at least one child blockchain,
 vii. at least one set of procedures for removing at least one block from said at least one parent blockchain, where said at least one block was appended to said at least one parent blockchain after said calculation of a net state of said at least one parent blockchain,
 viii. at least one set of procedures for creating anti-blocks to be appended to said at least one parent blockchain to reconcile removal of said at least one migration block from said at least one parent blockchain,
 ix. at least one set of procedures for re-validating said migration blocks removed from said at least one parent blockchain, and to be appended to said at least one child blockchain,
 x. at least one set of procedures for redirecting transactions, subsequent to any migration of transactions from said at least one parent blockchain, to blocks to be incorporated into said at least one child blockchain;
(b) selecting at least one set of selected transactions from said at least one parent blockchain for migration to said at least one child blockchain, based on said at least one set of selection criteria; (c) calculating a "net state" of each set of selected transactions according to said transformation protocol; (d) creating at least one new block of transactions from said selected transactions to be migrated to said at least one child blockchain, according to said transformation protocol; (e) validating said created at least one new block of transactions, according to said transformation protocol; (f) appending said created and validated at least one new block of transactions to said at least one child blockchain, according to said transformation protocol; and (g) redirecting applicable transactions, after any migration of transactions from said at least one parent blockchain, to blocks to be incorporated into said at least one child blockchain.

A further preferred embodiment of the invention is a system for extending the utility of an information-technology blockchain, comprising (a) a first computer processor having machine-readable storage medium specifically configured to maintain and execute a transformation protocol of at least one of the following:
 i. at least one set of criteria for selecting a plurality of transactions ("selected transactions") from at least one information-technology blockchain ("parent blockchain"),
 ii. at least one set of criteria for identifying at least one destination information-technology blockchain ("child blockchain"),
 iii. at least one set of procedures for calculating a net state of said at least one parent blockchain,
 iv. at least one set of procedures for transforming said selected transactions to conform and be migrated to said at least one child blockchain,
 v. at least one set of procedures for creating at least one new block of transactions from said selected transactions to be migrated to said at least one child blockchain ("migration blocks"),
 vi. at least one set of procedures for validating any new blocks created for transformation to said at least one child blockchain,
 vii. at least one set of procedures for removing at least one block from said at least one parent blockchain, where said at least one block was appended to said at least one parent blockchain after said calculation of a net state of said at least one parent blockchain,
 viii. at least one set of procedures for creating anti-blocks to be appended to said at least one parent blockchain to reconcile removal of said at least one migration block from said at least one parent blockchain,
 ix. at least one set of procedures for re-validating said migration blocks removed from said at least one parent blockchain, and to be appended to said at least one child blockchain,
 x. at least one set of procedures for redirecting transactions, subsequent to any migration of transactions from said at least one parent blockchain, to blocks to be incorporated into said at least one child blockchain;
(b) at least one second computer processor having machine-readable storage medium specifically configured to execute the following methodology steps:
 i. selecting at least one set of transactions from said at least one parent blockchain for migration to said at least one child blockchain, based on said at least one set of selection criteria,
 ii. copying said at least one set of selected transactions from said at least one parent blockchain,
 iii. transmitting said at least one set of selected transactions to at least one third computer processor,
 iv. redirecting applicable subsequent transactions to said at least one third computer processor according to said transformation protocol, v. creating anti-blocks consisting of new transactions that reconcile removal of said at least one set of selected transactions from said at least one parent blockchain; and (c) at least one third computer processor having machine-readable storage medium specifically configured to execute the following methodology steps:
i. receiving said at least one set of selected transactions from said at least one second computer processor,
ii. calculating a "net state" of each said at least one set of selected transactions,
iii. requesting of said at least one second computer processor identification of any additional transactions recorded by said at least one parent blockchain after calculation of said net state, according to said transformation protocol,
iv. receiving said requested additional transactions,
v. creating at least one new block of transactions from each at least one set of selected transactions, according to said transformation protocol,
vi. validating said at least one new block of transactions for appending said at least one new block of transactions to said at least one child blockchain, according to said transformation protocol,
vii. appending said identified and validated at least one new block of transactions to said at least one child blockchain, according to said transformation protocol.

BRIEF DESCRIPTION OF THE DRAWINGS

For the purposes of illustrating the invention, the attached drawings show certain aspects and embodiments that are presently preferred. However, it should be understood that the invention is not limited to the precise methodology or process steps or system elements as shown in the accompanying drawings, but rather is further disclosed and claimed according to the attached claims.

DETAILED DESCRIPTION OF CERTAIN PREFERRED EMBODIMENTS

Innovative systems and methods for creating offspring, or "children" of a "parent" blockchain datastore while retaining the integrity of the parent blockchain transaction history, and further providing for archiving of the parent blockchain are disclosed and described through the followed several preferred embodiments and example applications. Blockchains may be used to record any set of transactions. By way of overview background, a blockchain is generally defined as being a computerized ledger or record of transactions. The blockchain or ledger "grows" as "completed" blocks, which correspond to new transactions or sets of transactions (e.g., changes of custody or ownership) are added to the blockchain. The new transactions are grouped into blocks and the new blocks are then added or appended to the blockchain only after each new block undergoes a validation process.

For definitional and clarification purposes, the term "transaction" is intended to broadly cover any type of transfer of any type of product, material, device component, package, and/or physical or electronic document or file, including virtual assets such as data, electronic files, intangible assets (such as domain names, various intellectual property, trademarks, or copyrights), or even crypto-currencies. Moreover, apart from the transfer of assets, "transaction" is further intended to cover any type of log entry which may record actions or non-actions. Further, the term "blockchain" is used herein to refer to any technology that allows for the creation of a non-repudiable transaction record or ledger that is resistant to falsification.

Figure 1:
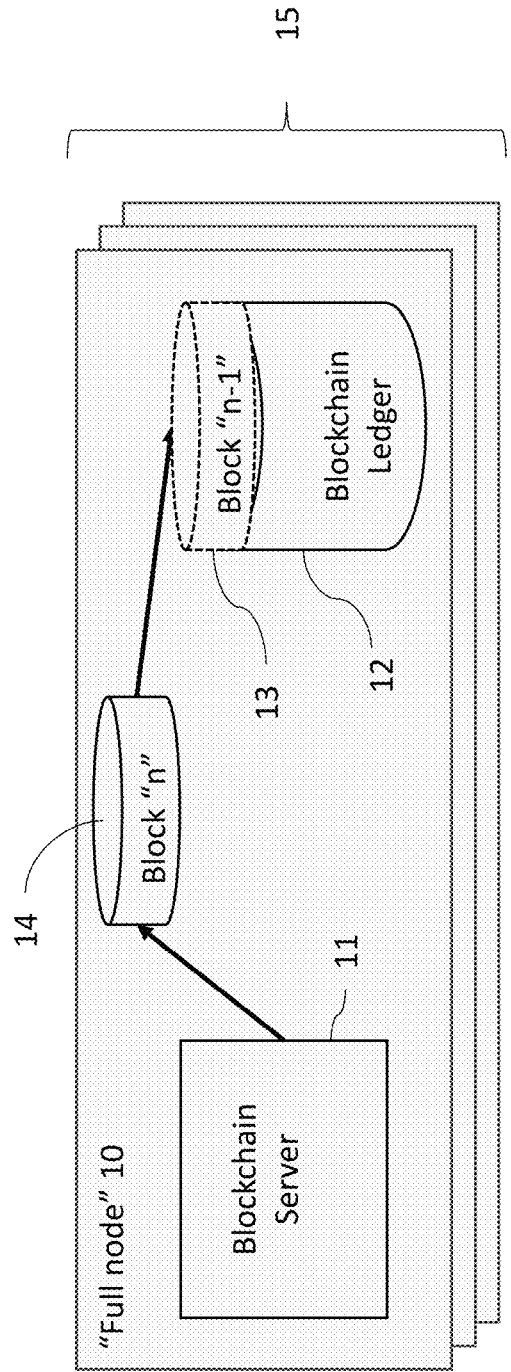
FIG. 1 is an illustrative block diagram of standard information technology blockchain architecture.

A typical blockchain system and configuration is illustrated in FIG. 1. A blockchain "full node" 10 includes a server 11 (also known as a "full node") that processes validated blocks 13, 14 and after completion of the protocol processing, appends the blocks 13, 14 to the current blockchain ledger 12 in the chronological order in which the validated blocks 13, 14 are processed. Such processing and appending of validated blocks 13, 14 may be simultaneously occurring on multiple blockchain nodes 15.

Figure 1A:
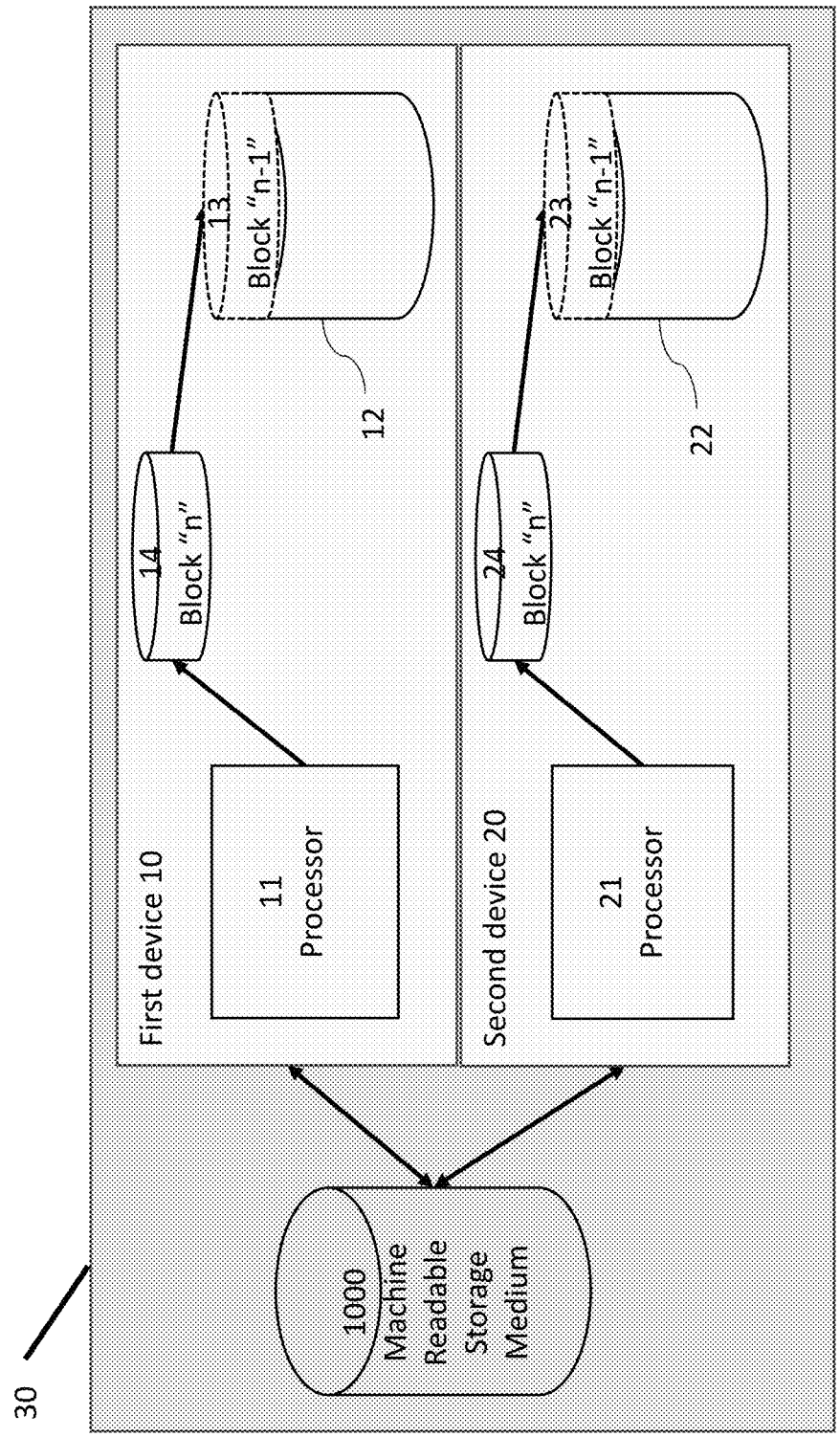
FIG. 1A is another illustrative block diagram of a multiple information technology blockchain structure.

FIG. 1A shows a further example of a blockchain system having multiple devices and multiple blockchain ledgers. As illustrated, a system 30 comprises a machine-readable storage medium 1000 that is accessed by at least two devices 10, 20, with each device 10, 20 comprising a processor 11, 21 (examples of "full nodes") that process validated blocks 13, 14, 23, 24. Upon completion of the protocol processing, the validated blocks are added to the current blockchains 12, 22.

Figure 2:
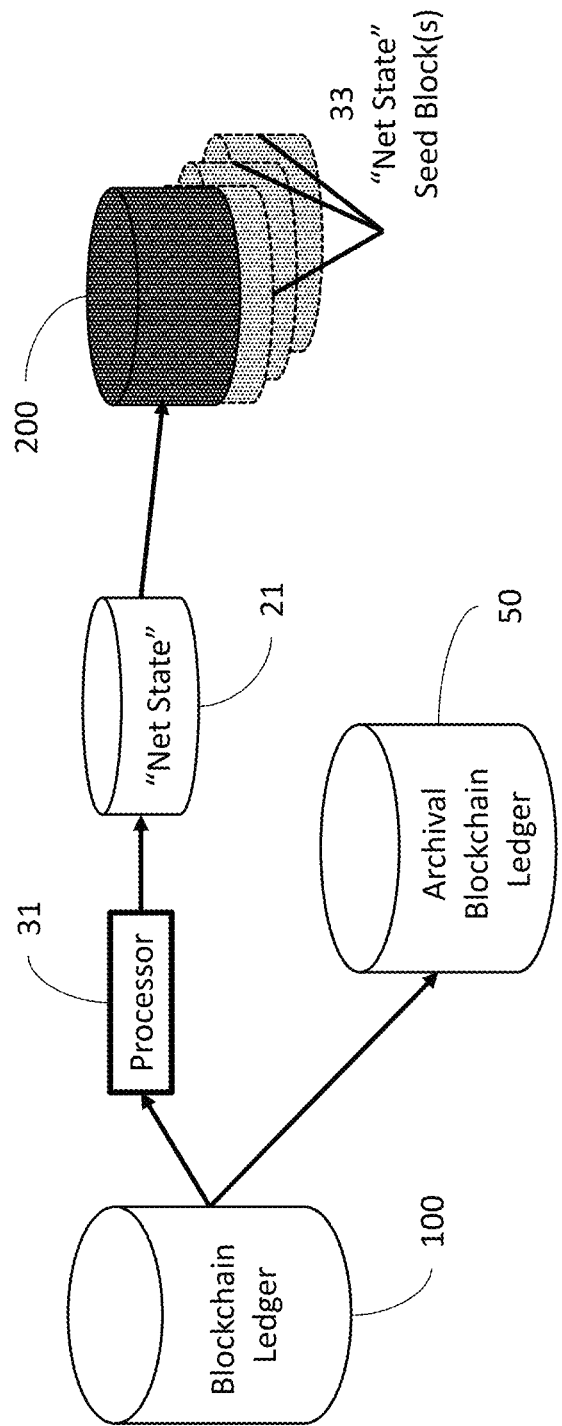
FIG. 2 is an overview system diagram of an exemplary embodiment of the primary system elements of the disclosed inventive system.

FIG. 2 illustrates an exemplary core embodiment of the disclosed innovative system. More particularly, the system includes a processor 31 that reads the entirety of a parent blockchain ledger 100. The processor 31 then creates a "net state" 21 of the current parent blockchain ledger 100. The net state 21 summarizes the current status of all assets tracked by the blockchain ledger 100. In some embodiments, the net state 21 may include a pointer to the last transaction of each user of the system on the parent blockchain 100 to facilitate a link to the archival records. Next, the created net state 21 becomes a seed or genesis block 33 and is used to commence or start at least one new blockchain 200 to which all subsequent transactions will be directed. Because of block-size limitations, as illustrated in FIG. 2, certain blockchains may require several seed blocks to fully instantiate the net state. As further shown in FIG. 2, the original parent blockchain 100 may be archived in its entirety as a separate archived blockchain ledger 50. The parent blockchain 100 should generally be retained and archived in order to maintain the complete history of the full blockchain ledger and transaction history. As noted, upon the creation of the new or child blockchain 200, and the archiving of the parent blockchain 50, subsequent transactions are then appended to the child blockchain(s) 200.

Figure 3:
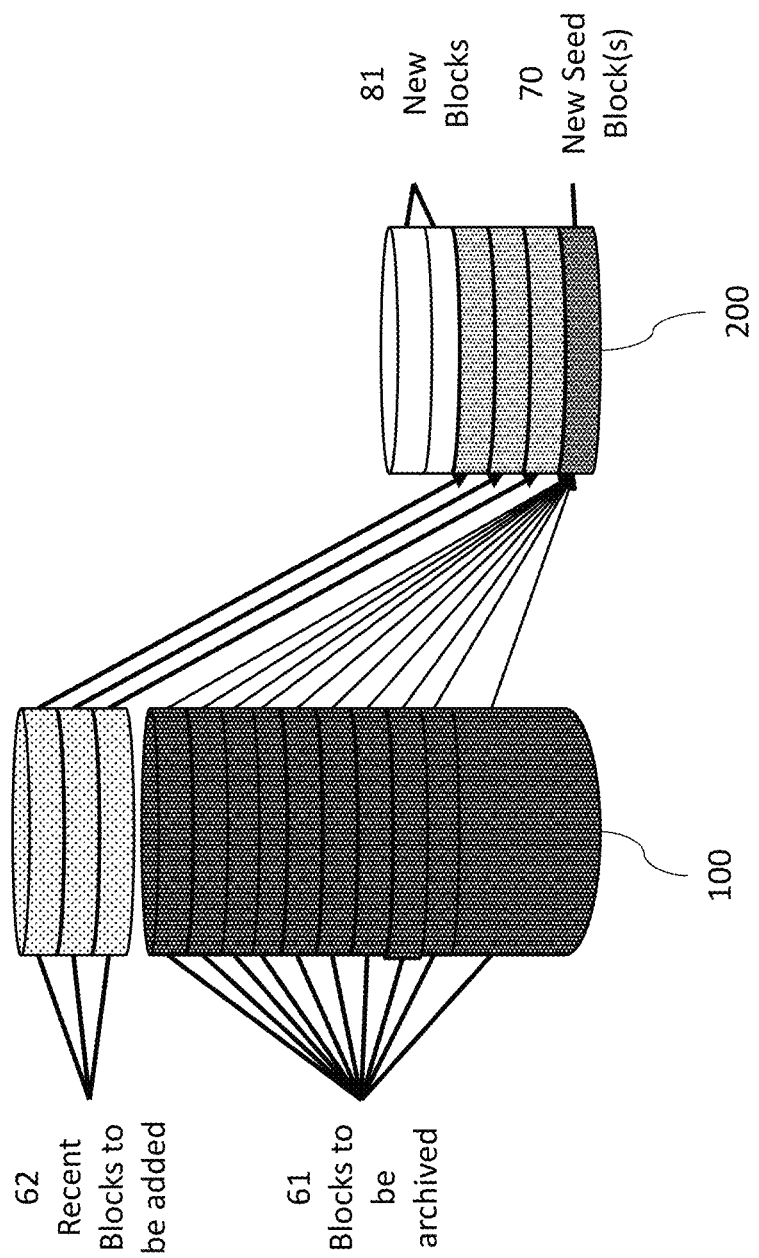
FIG. 3 is an illustrative system diagram of an exemplary embodiment of the disclosed inventive system showing creation of a new blockchain instance.

FIG. 3 illustrates in further detail an example application of preferred embodiments of the disclosed system. More particularly, a "current" blockchain state 100 is shown with a series of blocks 61 to be summarized and archived. The current blockchain state 100 further shows a series of "to be" appended blocks 62. Instead of adding these new blocks 62 to the parent blockchain 100, these new blocks 62 are appended to a new seed block 70, such that a new child blockchain 200 is created or commenced. The seed block 70 consolidates all of the information included in the current blockchain state 100. In some applications, it may be necessary to back-out certain late blocks from the current state archive 60 and add them instead, to the new blockchain instance 200. As described above, upon the creation of the new or child blockchain 200, subsequent or new blocks 81 may be appended directly to the new blockchain instance 200.

In some embodiments, blocks may need to be revalidated. This may be true of blocks backed out of the now-archived instance 100 that are to be appended to the new instance 200. In other embodiments, this process may be automated according to a protocol approved by the users of the blockchain in order to minimize the time to create new blocks or initiate the new blockchain instance without compromising the integrity of the data. In most all applications and scenarios, the archived blockchain remains accessible to allow verification of any prior transactions.

The disclosed process should be distinguished from the process known as "forking." Forking of a blockchain occurs when a blockchain splits new transactions into two or more branches connected to the underlying chain. Accordingly, forking retains the initial blocks as the root of all forked or subsequent chains. As a result, the complete blockchain does not become smaller, and indeed generally becomes more complex and larger. One benefit of having a blockchain fork, is that use of such separation permits individual forks to each grow more slowly because new blocks may be divided among the different forks. Another potential benefit is that the new blockchain fork may implement different policies than the original or parent blockchain. Such different policies may relate to new block schema or different block validation protocols or regimes.

In a preferred embodiment of the present invention, one or more of the benefits of forking, may be readily implemented. More particularly, with the creation of two or more new or child blockchains 200, subsequent blocks 81 may be appended directly to the applicable new blockchain 200. The determination of where subsequent blocks 81 should be directed or appended may be a function of different block validation protocols or different block schema. Such different block protocols and schema may be distinct from the protocols or schema used by the parent blockchain, and generally will be different from each other.

Figure 4:
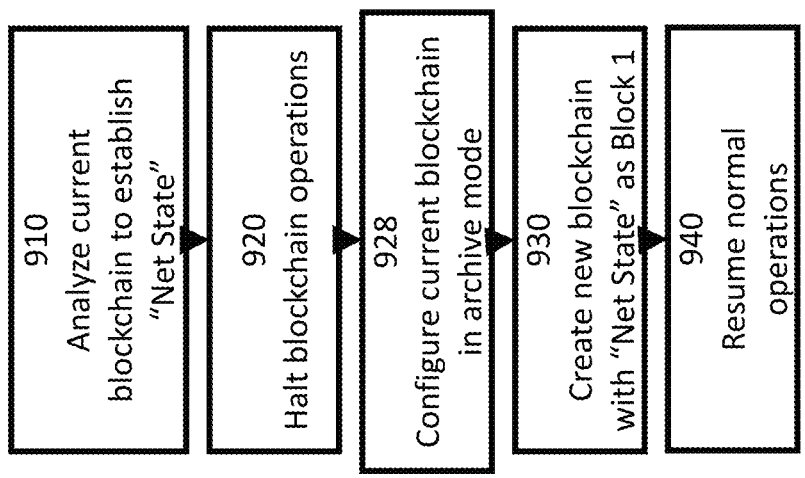
FIG. 4 is an illustrative flowchart of an exemplary embodiment of certain core functions of the disclosed inventive system.

An example process flow of the core methodology steps is shown in FIG. 4. More specifically, the process initiates with creation of a "net state" by analysis 910 of a current blockchain 100. Next, current blockchain operations are then suspended 920 to ensure that the net state remains consistent with the current (parent) blockchain 100. The current blockchain 100 is then set 928 into an archive configuration. Such an archive configuration will, in preferred embodiments entail the prevention of appending new blocks to the to-be-archived parent blockchain. The net state is then created 930 and configured into at least one seed block 70. Then, blockchain operations may resume 940 with all new or subsequent blocks 62, 81 being appended to the new (child) blockchain 200.

Figure 5:
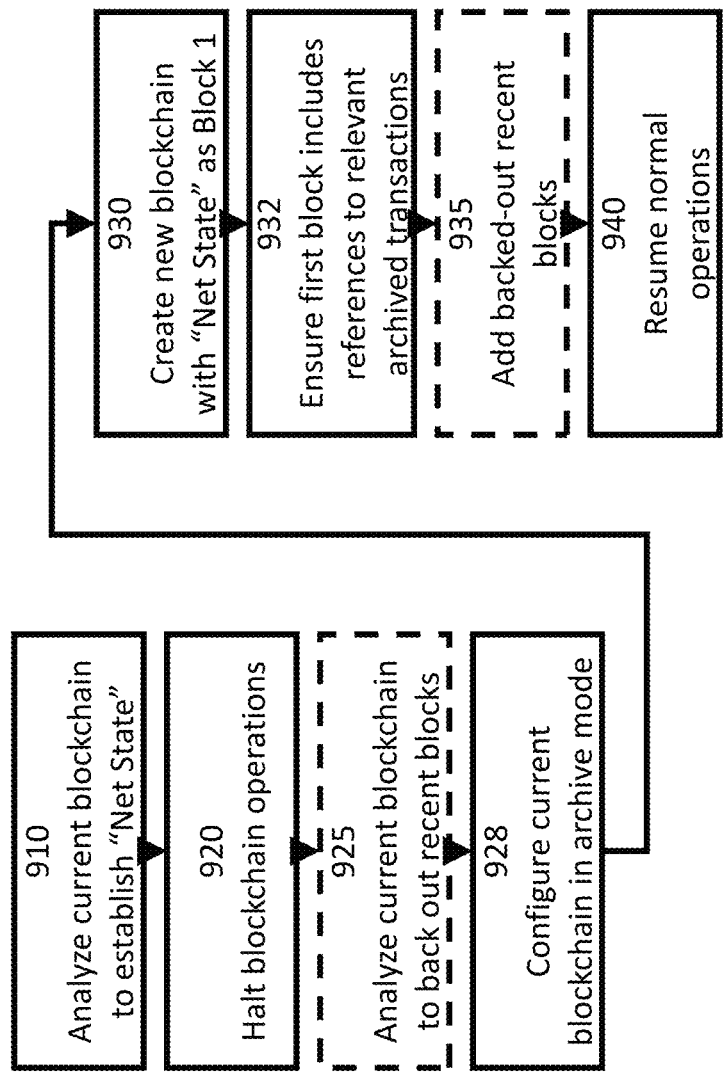
FIG. 5 is an illustrative flowchart of an exemplary embodiment of certain steps of the inventive methodology showing the process of "backing out" blocks from a parent blockchain and appended such blocks to the new child blockchain.

In another embodiment of the disclosed methodology, illustrating the "backing out" of blocks from a parent blockchain 100 and re-appending them to a child blockchain 200, FIG. 5 presents further detail of such a process flow. More particularly, and similar to the process described in FIG. 4, the process begins with creation of a "net state" by analysis 910 of a current blockchain 100. The current blockchain operations are then suspended 920 to ensure that the net state remains consistent with the current blockchain 100. At this point, the parent blockchain 100 is analyzed 925 to determine which, if any, blocks contain transactions that need to be removed and transferred to the new child blockchain 200.

These "to be removed" transactions are then appended to the seed blocks before the new blockchain begins accepting new blocks in order to ensure appropriate sequencing of the blockchain blocks, as illustrated in FIG. 3. As described above, the current blockchain 100 is set 928 into an archive configuration, which will prevent the appending of new blocks to the parent blockchain 100. The net state is next created 930 and configured into at least one seed block 70. In step 932, the system confirms that the first block includes any necessary references to the relevant archived transactions (e.g., the address link to the last block and/or the last transaction of each party in the archived parent blockchain). Next, as shown in step 935, the "backed out" blocks are appended to the new seed block 70. At this point, blockchain operations may again resume 940 with all new or subsequent blocks being appended to the new (child) blockchain 200.

One example of why the process described in FIG. 5 may be desirable, could be where a blockchain has particularly high throughput. In such a scenario, to alleviate the need for stopping or impeding the blockchain process while the archiving operation is performed, blocks can be added to the parent blockchain after the net state is created, and then the "after-added" blocks may be transferred to the new child blockchain once the seed block(s) are instantiated. This transfer will typically require a revalidation of the "after-added" blocks, based on the new hashed value of the last net state in the new child blockchain versus the prior hashed value of the predecessor block in the parent chain.

In other applications, there may be a need to create the "net state" at a point in time prior to the current time. Such an application would entail the incorporation of one or more historical blocks into the new or child blockchain. Historical blocks are those blocks that are in existence prior to the current time. Such a configuration allows the new blockchain to include one or more historical blocks before the new blockchain takes over all new transactions.

In order to ensure appropriate connection of the new blockchain 200 with the parent blockchain 100, the new blockchain 200 may also incorporate a linkage between the state of the new blockchain 200 and the historical archived blockchain. For example, blockchain transactions typically involve at least two parties with the transfer of information or an asset from one party to the other. For a traditional transaction involving a plurality of parties, each party, or element of information relating to that transaction, may be recorded in the relevant blockchain block. When the net state is created and the seed block is formed, that seed block may include a reference to each of the parties along with their net balance of any assets being tracked in the blockchain, and to the last block of the archived parent and, potentially, to their last transaction included in the archived parent blockchain, or both. Such a link provides a means for preserving the historical integrity of the entire combined blockchain.

A further application of the disclosed systems and methodology provides a means to split a current or parent blockchain into two or more child blockchains. Such split blockchains allow for segregating of transactions into different child blockchains, which will generally make each new child blockchain more manageable. This approach can also serve to allow a blockchain to migrate from one blockchain environment (e.g., a public blockchain) to another (e.g., a private blockchain). This may be particularly valuable as new blockchain environments are created that offer lower cost, faster processing, higher trust, or other benefits.

Figure 6:
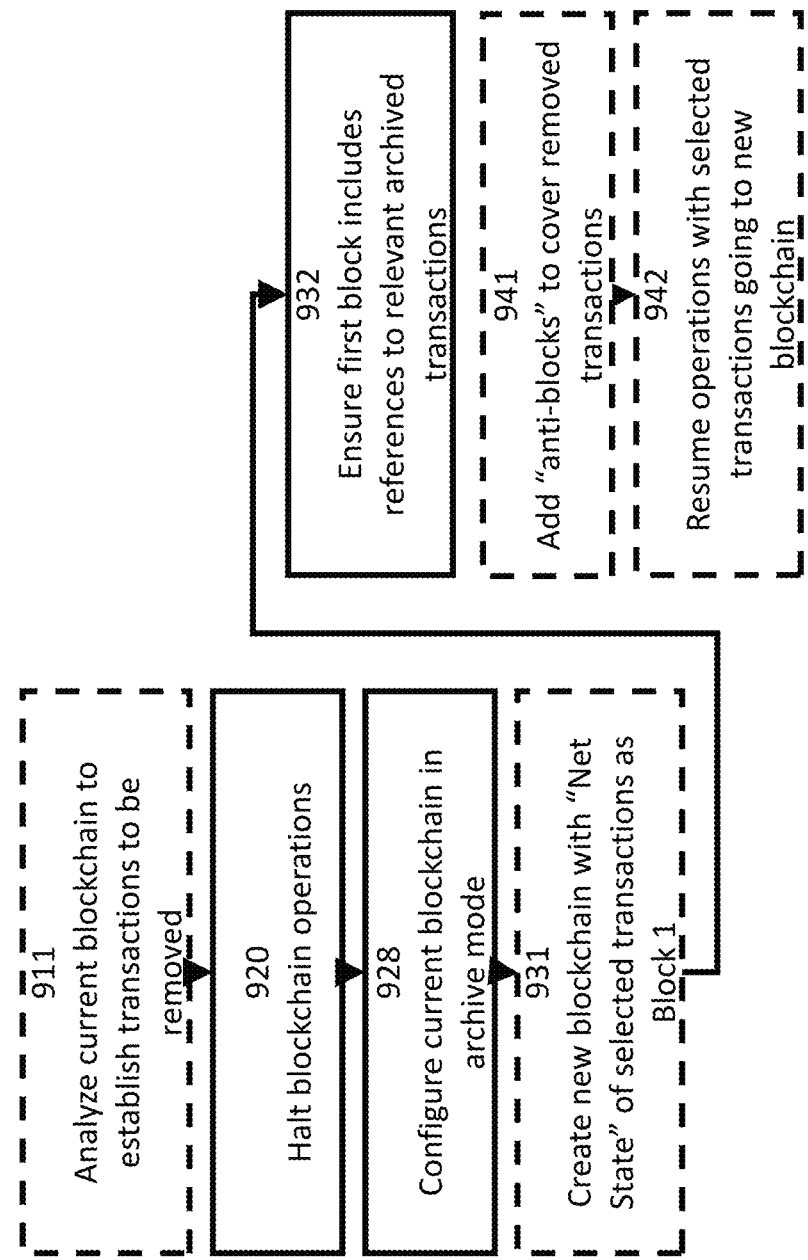
FIG. 6 is an illustrative flowchart of an exemplary embodiment of steps of the inventive methodology showing the process of creating a new blockchain using selected blocks from a parent blockchain and appending "anti-blocks" to balance the selected block transition to a new blockchain.

In a further embodiment of the disclosed systems and methodology, FIG. 6 shows a process flow for the selective migration of particular transactions found in identifiable blocks to a new blockchain. More particularly, instead of creating a net state of an entire current blockchain 100, only selected transactions within the current blocks of the current blockchain 100 are used to create at least one new seed block of one or more new child blockchains 200. The process flow shown in FIG. 6 follows the basic process describe above relating to FIG. 4, but additionally includes step 911 to analyze the parent blockchain to identify blocks in the parent that include transactions that meet specified selection criteria and that are to be migrated to the new child blockchain 200. Further, in step 931, a seed block for the new blockchain 200 is created using only the previously selected transactions from step 911. This new seed block 70 is then used to initiate the new blockchain 200. Once transactions are migrated to the new child blockchain 200, "anti-blocks" are created and appended 941 to the parent blockchain 100 to balance the removal of the selected transactions that have been migrated to the new child blockchain 200. Finally, as noted in step 942, both blockchains continue operation with all subsequent transactions that are within the selection criteria being redirected to the new child blockchain 200.

Figure 7:
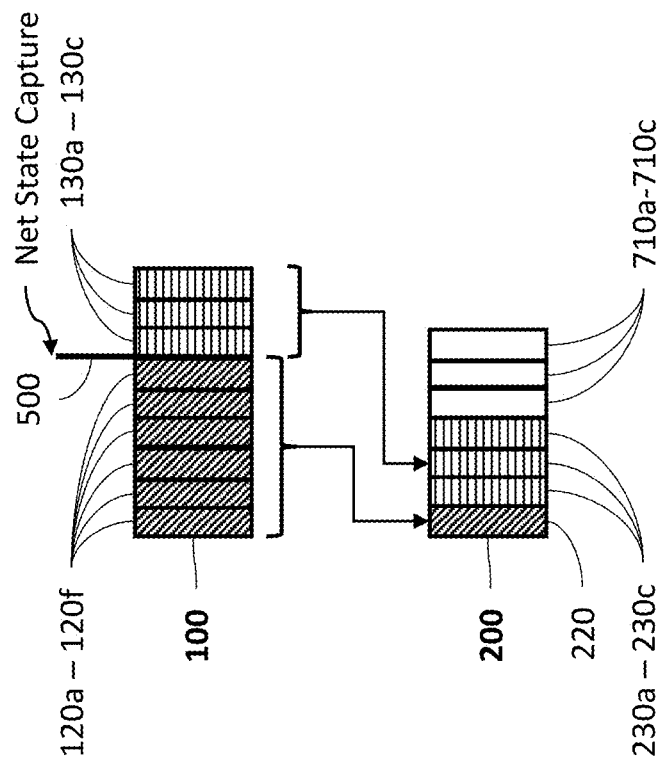
FIG. 7 is an illustrative system diagram showing creation of a single child blockchain from a single parent blockchain.

Further example embodiments of the inventive methodology, including further examples of the above described processes, are illustrated in FIGS. 7 through 15. More particularly, FIG. 7 graphically illustrates the creation of a single child blockchain 200 from a single parent blockchain 100. Upon the determination of a need to create a child blockchain 200, a net state of the current parent blockchain 100 is captured 500, and a new "seed" or net state block 220 is created that incorporates the relevant information of the parent blockchain blocks 120a through 120f as shown in FIG. 7. Because blocks may be added to the parent blockchain 100 after the net state capture 500, these newly added blocks 130a through 130c, are appended to the new "seed" block 220 as blocks 230a through 230c. Thereafter, as new blocks 710a through 710c were to be appended to the blockchain 100, they are instead directly added to the child blockchain 200. At this stage, the parent blockchain 100 may be archived, to be accessed only upon need for verification of historical records.

Figure 8:
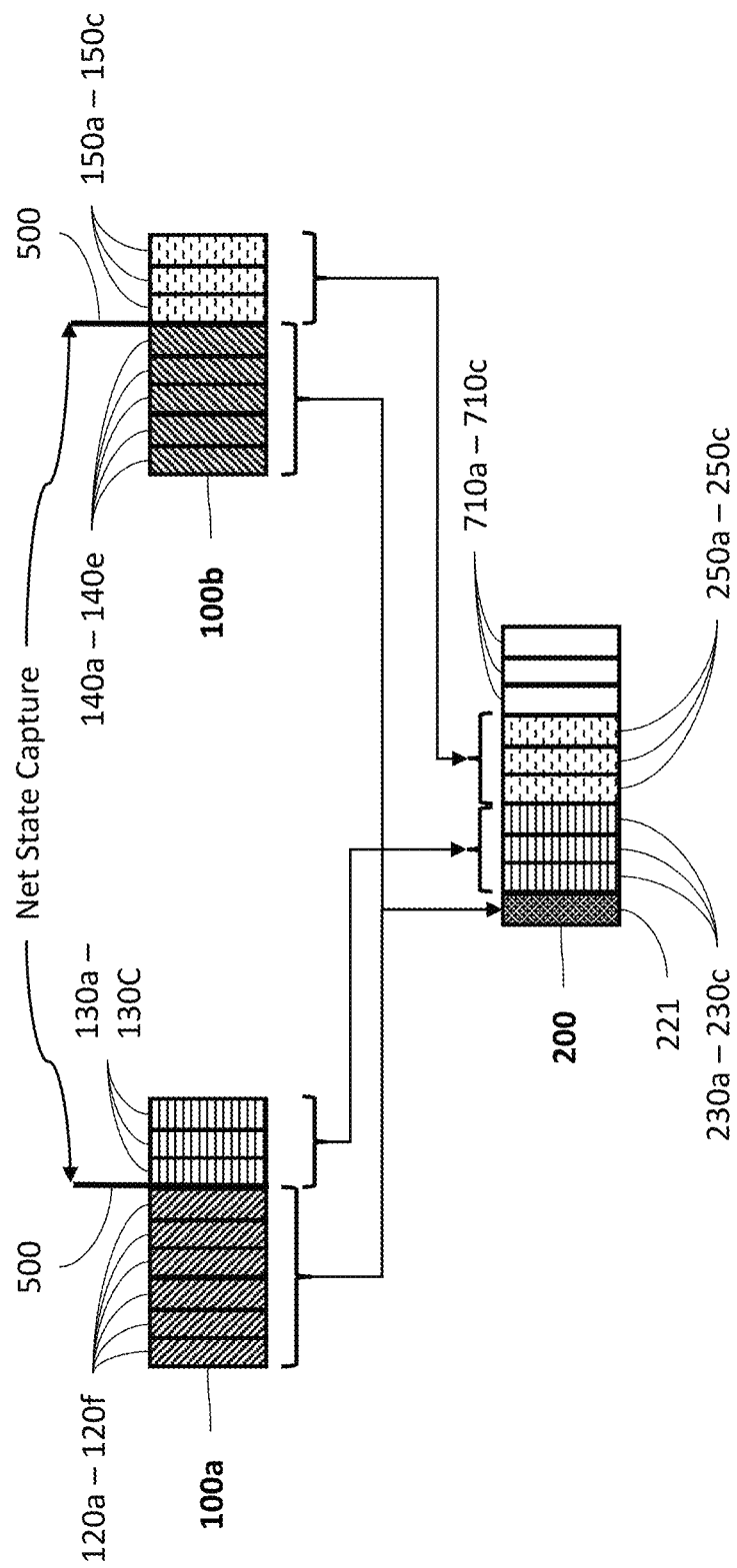
FIG. 8 is an illustrative system diagram showing creation of a single child blockchain from two or more parent blockchains.

For a situation where two or more parent blockchains 100a, 100b are to be coalesced into a single child, FIG. 8 illustrates such a process. Similar to that shown in FIG. 7, and described above, after the capturing of the net states of parent blockchains 100a, 100b, a new combined "seed" block 221 is created as the genesis for the single child blockchain 200. The net state "seed" block 221 incorporates the relevant information from parent blockchain 100a blocks 120a through 120f, and from parent blockchain 100b blocks 140a through 140e.

Again, because blocks 130a through 130c, and 150a though 150c may added to parent blockchains 100a and 100b respectively subsequent to the net state capture, those new blocks 130a through 130c and 150a through 150c are to be appended to the new combined "seed" block 221 as blocks 230a through 230c and 250a through 250c as shown in FIG. 8. Thereafter, all subsequent new blocks that were to be added to either parent blockchain 100a or 100b, are appended to the child blockchain 200 shown in FIG. 8 as blocks 710a through 710c.

Figure 9:
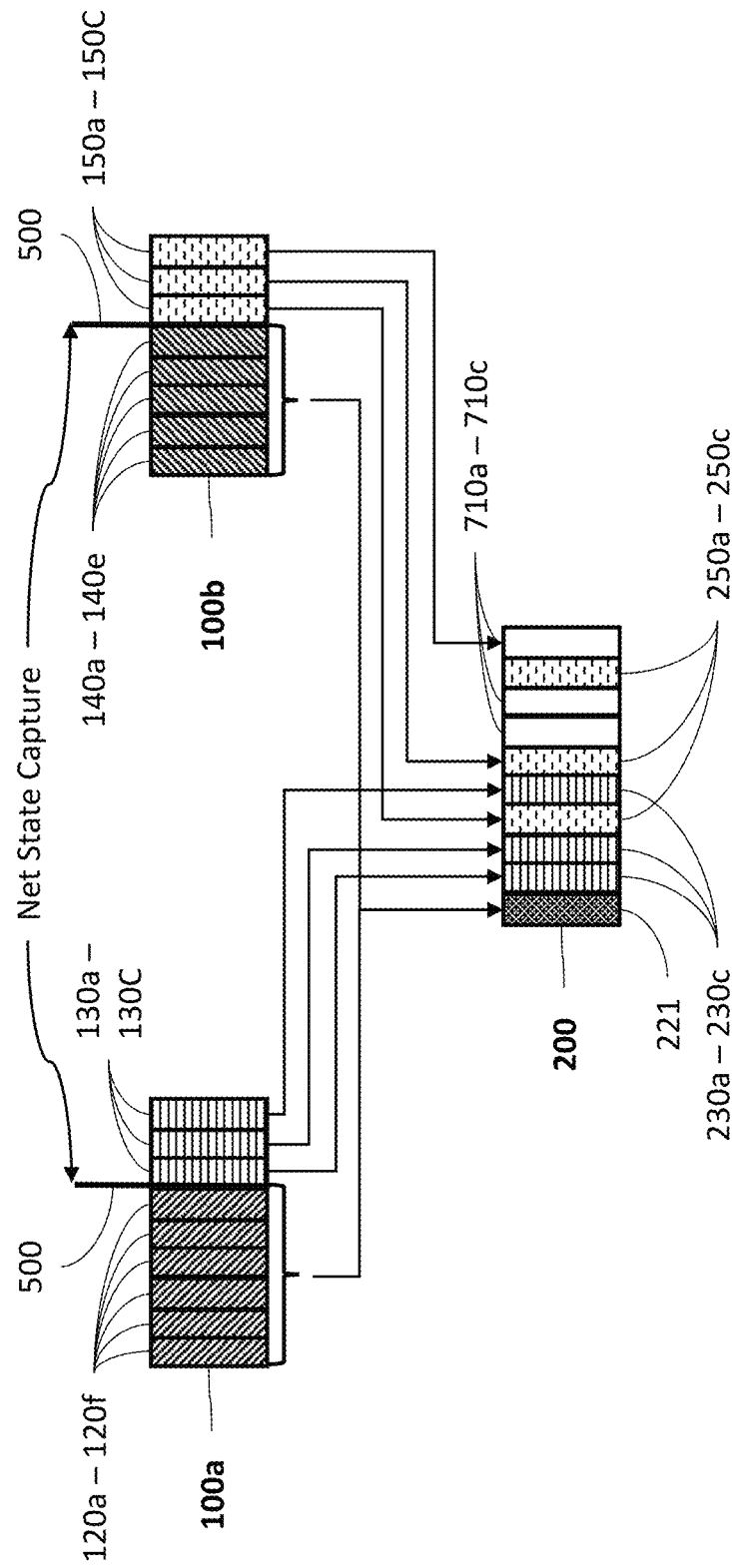
FIG. 9 is an illustrative system diagram showing creation of a single child blockchain from two or more parent blockchains and showing chronological interspersing of the "after net state" two parent blockchain blocks.

While blocks 130a through 130c and 150a through 150c are shown in FIG. 8 as being appended in series to seed block 221, a more typical sequence of appending such new blocks to the child blockchain 200 is shown in FIG. 9. This more likely sequence shows that the blocks 230a, 230b, 230c, and 250a, 250b, 250c are created at different times and thus are more likely to be appended to the child blockchain 200 in a time-sequenced manner, rather than grouped by their parent blockchain. That is, the appending may be, as illustrated, blocks 230a, 230b, 250a, 230c, 250b, two other newly formed blocks, 250c, and other newly formed blocks.

Figure 10:
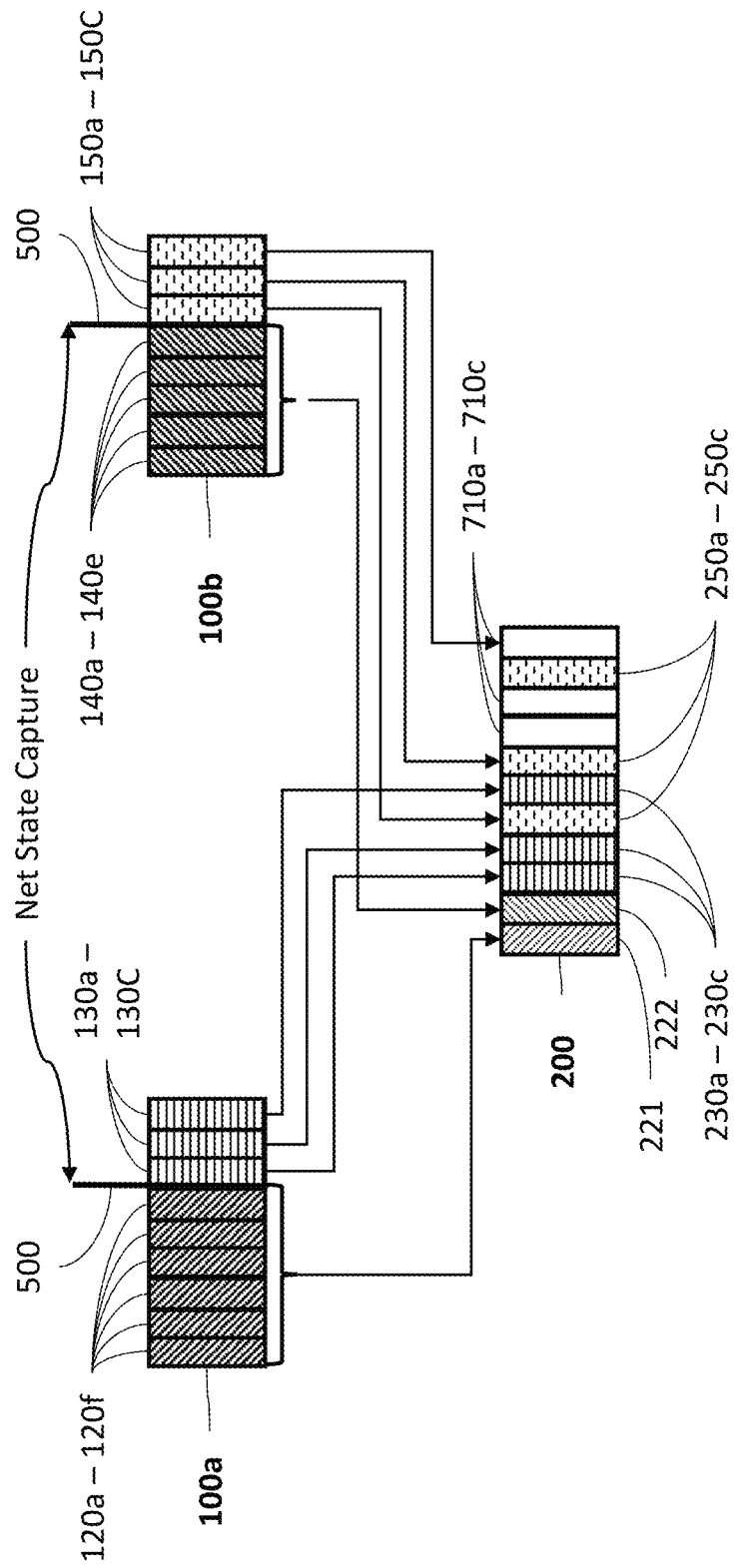
FIG. 10 is an illustrative system diagram showing creation of a single child blockchain from a two or more parent blockchains showing series connection of the plurality of parent blockchain seed blocks.
Figure 11:
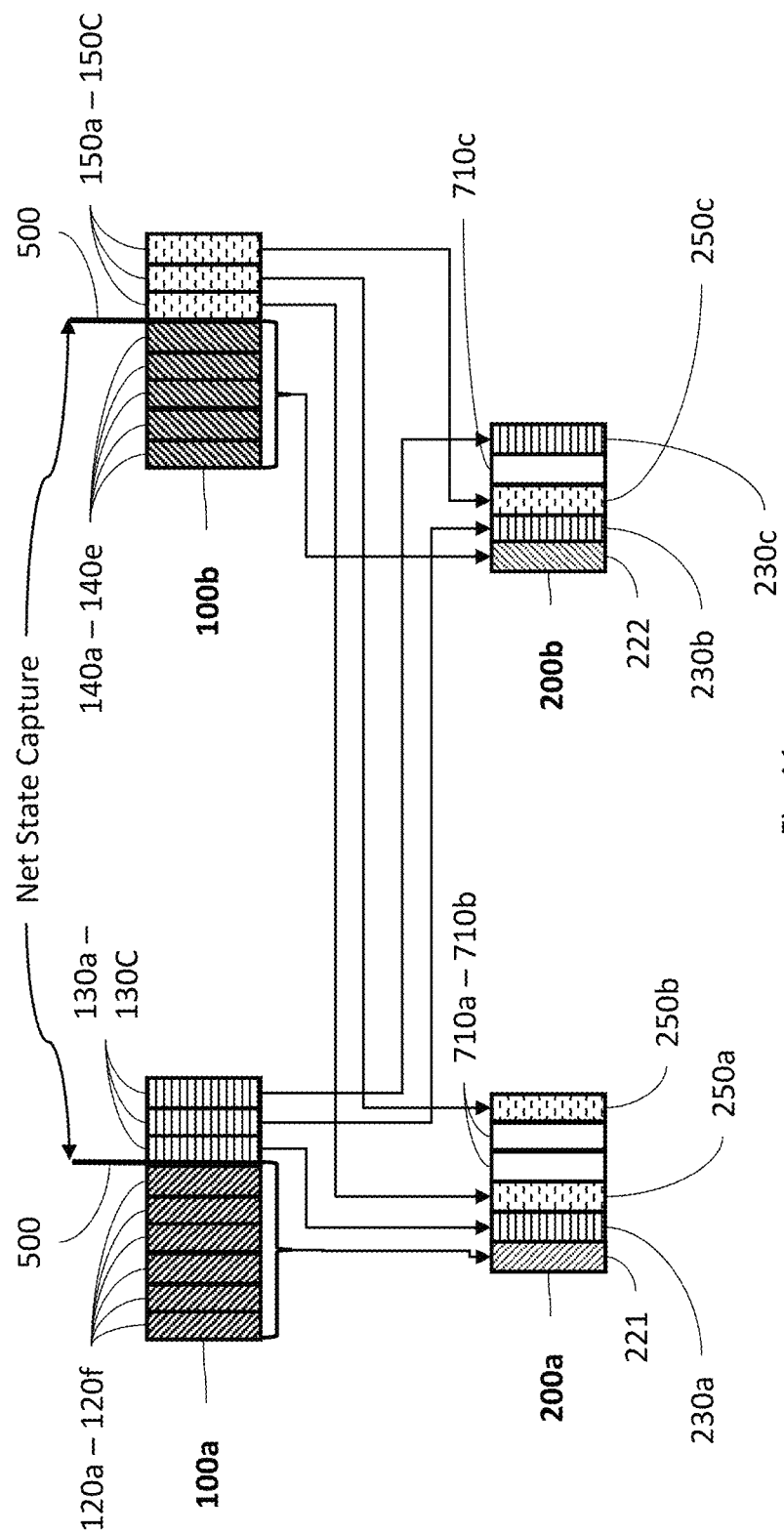
FIG. 11 is an illustrative system diagram showing creation of two or more child blockchains from two or more parent blockchains.

FIG. 10 illustrates a similar creation of a child blockchain from two or more parent blockchains however instead of creating a combine single seed block, the net state capture of each parent creates a distinct "seed" block that are then connected in series to start the child blockchain. Similarly, FIG. 11 shows a creation of two or more child blockchains from two or more parent blockchains. As shown in FIG. 11, the after net state blocks added to the parents may be appended to either or any of the child blockchains as a function of varied protocols or schemas used by the respective parent blockchains, as described above.

Figure 12:
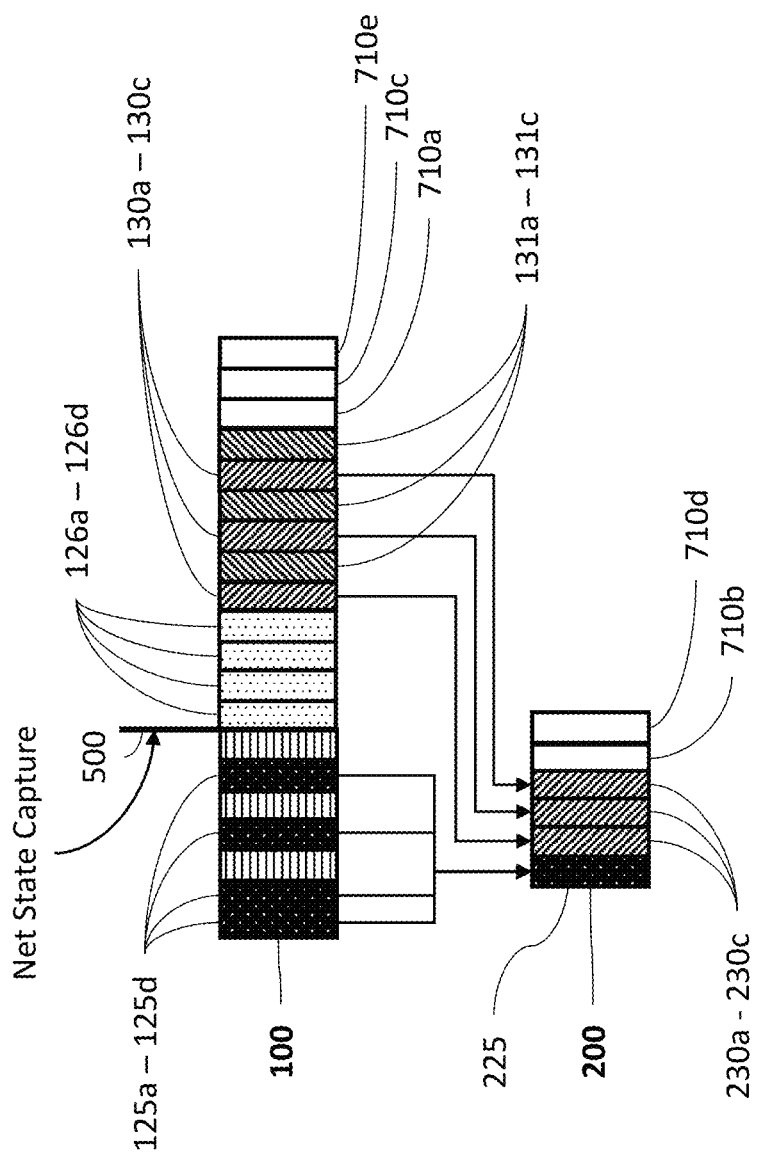
FIG. 12 is an illustrative system diagram showing creation of a single child blockchain using selected blocks from a single parent blockchains and showing continued utility of the parent blockchain.

In another embodiment, instead of fully archiving a parent blockchain and ceasing the addition of new blocks to the parent blockchain, rules or selection protocols may be devised and implemented to select only certain transactions of a parent blockchain to be used to form a new seed block for a child blockchain, and similar rules may be used to select specific blocks containing transactions to be appended to the new child blockchain. Such a structure and operation are illustrated in FIG. 12.

As shown, selected transactions from blocks 125a through 125d are coalesced into new seed block 225 at the net state capture 500 record point. Subsequently, selected transactions from blocks 130a, 130b, and 130c are added to the child blockchain as blocks 230a, 230b, and 230c respectively. As shown, such newly added blocks, composed of transactions from blocks based upon the selection protocols, are appended to the seed block 225 prior to the addition of new blocks 710b and 710d.

Because the parent blockchain 100 may continue on, the information or asset relating to the removed transactions in blocks 125a through 125d and 130a through 130c, needs to be negated to ensure a balanced parent blockchain 100. As shown in FIG. 12, such negation is accomplished by including "anti-blocks" 126a through 126d. These "anti-blocks" blocks are created to include necessary new transactions that reflect the movement of the selected transactions to the new blockchain 200 from blocks 125a through 125d respectively. Similarly, blocks 131a through 131c are appended to the parent blockchain 100 to account for the removal of the information or assets of those transactions in blocks 130a through 130c respectively that have been migrated to the new blockchain.

Figure 13:
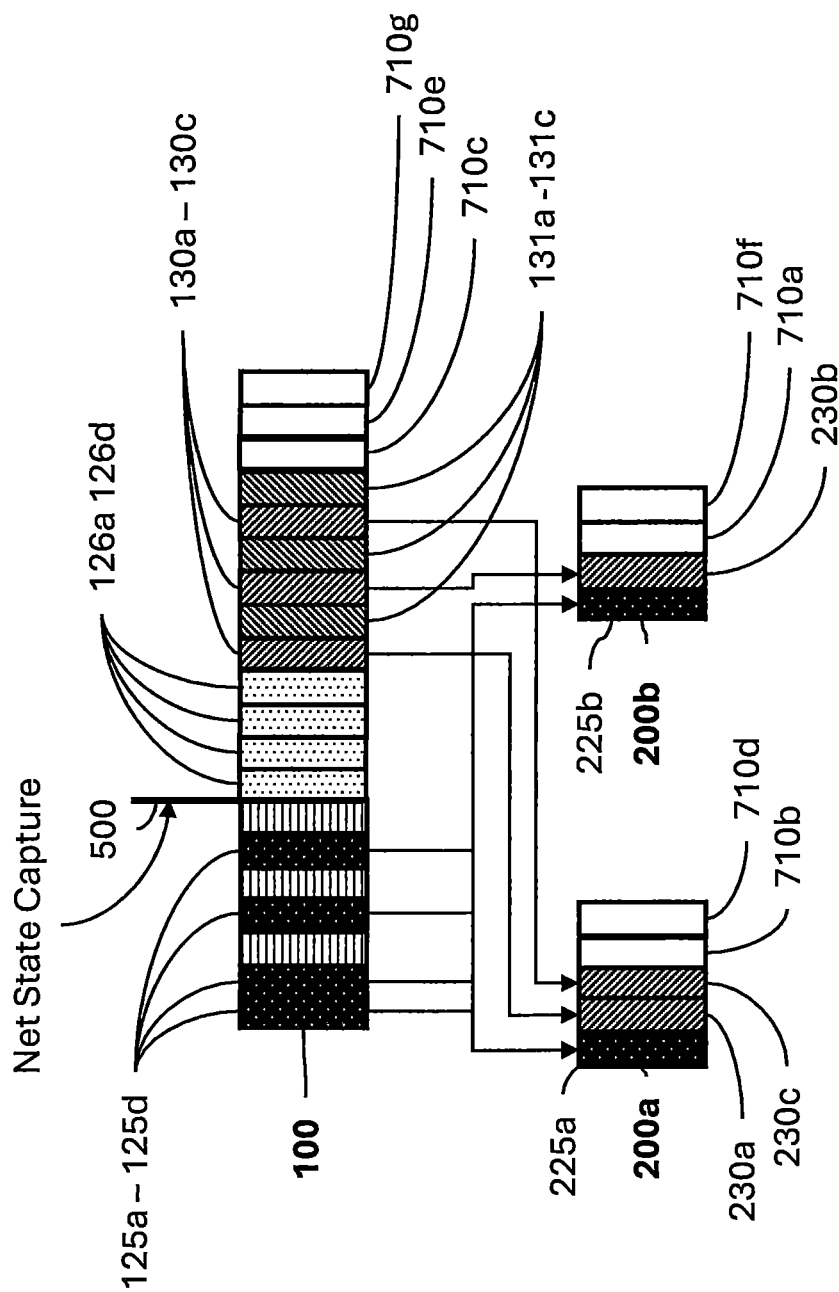
FIG. 13 is an illustrative system diagram showing creation of two or more child blockchains using selected blocks from a single parent blockchain and showing continued utility of the parent blockchain.

In similar fashion, FIG. 13 illustrates a similar operation where a single parent blockchain 100 is selectively coalesced into two or more child blockchains 200a, 200b. It should be noted that the selection occurs at the transaction level, not at the block level. Accordingly, while not specifically illustrated in FIG. 13, selected transactions within a single block may include transactions that are parsed to different child blockchains 200a and 200b.

Figure 14:
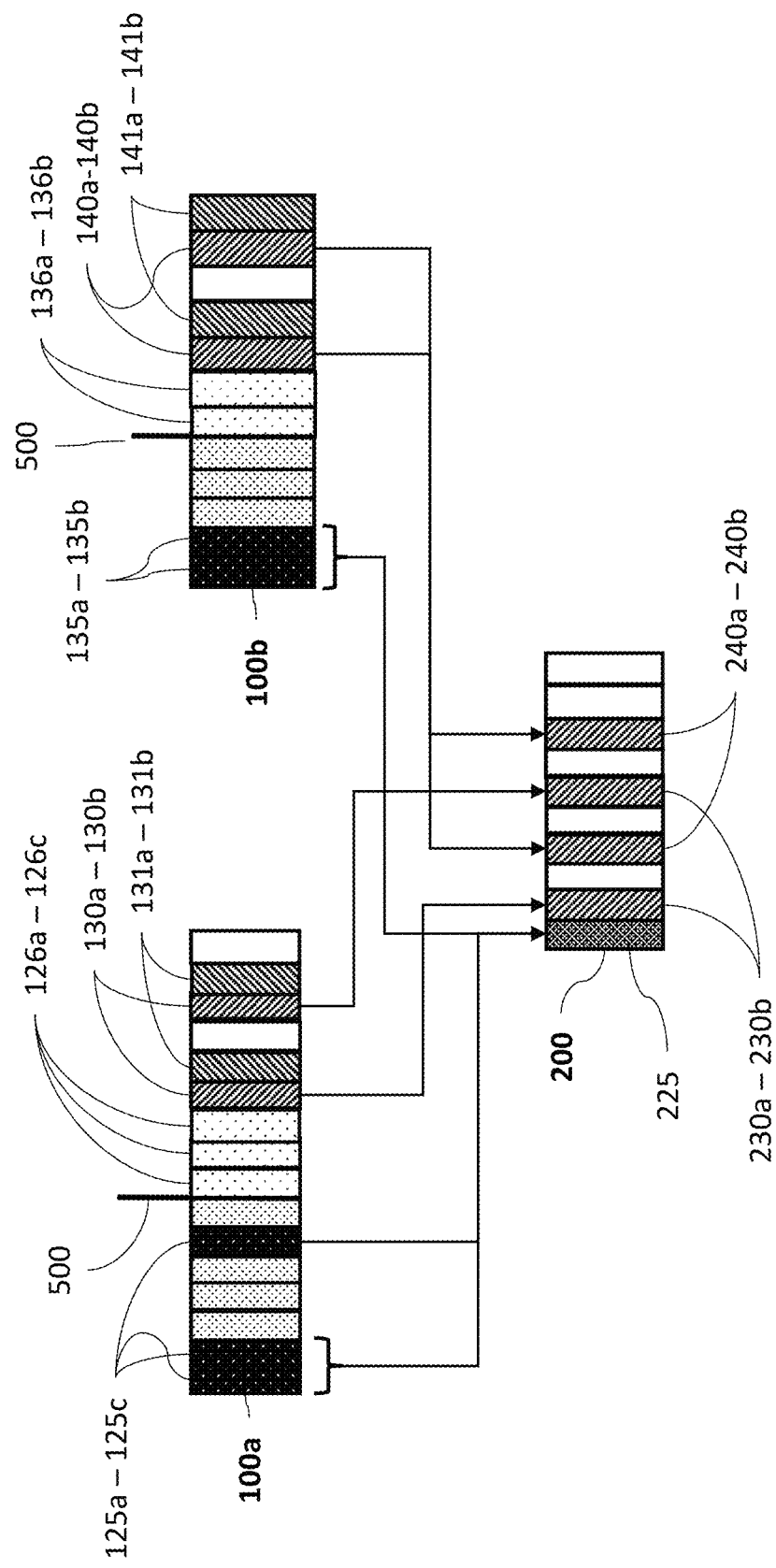
FIG. 14 is an illustrative system diagram showing creation of a single child blockchain from selected blocks from two or more parent blockchains showing appending of "anti-blocks" to balance transition of the selected parent blockchain blocks to the child blockchain.
Figure 15:
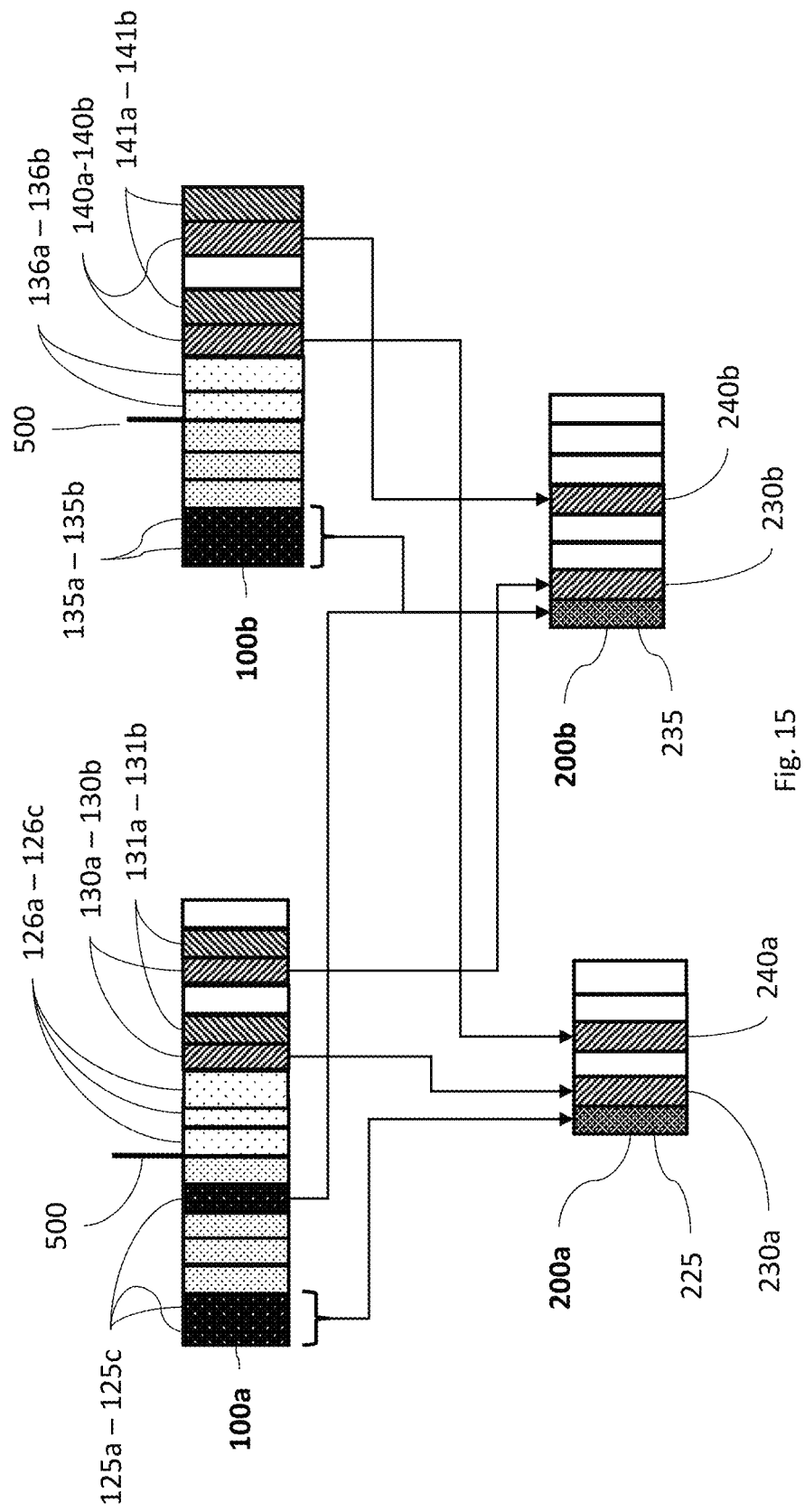
FIG. 15 is an illustrative system diagram showing creation of two or more child blockchains from selected blocks from two or more parent blockchains showing appending of "anti-blocks" to balance transition of the selected parent blockchain blocks to the child blockchain.

Using the same methodology of executing rules or a selection protocol for identifying and selecting only particular transactions in blocks that contain those transactions within one or more parent blockchains, a new child blockchain 200 may be created. FIG. 14 illustrates how such a combination and relation of the blocks could be transferred and linked. More particularly, FIG. 14 is essentially a variation of the methodology illustrated and described above in FIG. 9, except that instead of taking all prior block information upon the net state capture (i.e., blocks 120a through 120f), only the selected transactions from historical parent blockchain blocks, as determined by the relevant rules or selection protocol are used to create the new child seed block. Further, FIG. 15 shows the implementation of an embodiment of the methodology where two or more parent blockchains 100a, 100b are selectively collected to form two or more child blockchains 200a, 200b.

Another embodiment of the disclosed and claimed methods and systems provides a means to address "the right to erasure." With the promulgation of the General Data Protection Regulation (GDPR) within the European Union, individuals gained the right to have their Personal Identifiable Information (PII) removed by any entities that have recorded such PII. This has been further codified in the United States as part of the California Consumer Privacy Act (CCPA).

Various recent technologies, such as blockchain technology and other directed acyclic graphs, typically using cryptography, have been created with the intent of creating permanently immutable records of all recorded and stored information. (In this disclosure the term "blockchain" refers to any distributed ledger technology, including directed acyclic graphs, of which blockchains are a subset.) This intention of immutable storage of information appears to preclude the GDPR and CCPA erasure or removal rights, and potentially conflicts with these and other privacy laws.

One alternative to address this problem, considered by developers of blockchains has been to encrypt PII or keep all PII off the subject chain entirely. But these choices often add cumbersome complexity to blockchain solutions.

The disclosed methods and systems provide several solutions to address this and other issues that require the removal or obfuscation of data or information included in a first blockchain before migration and/or transformation of such information to a second blockchain. The rules for removing or obfuscating of information in the first blockchain may be a part of the rules for the first blockchain, or the rules may be separate from the first blockchain rules. By way of one example, the rules for removing or obfuscating of information may be merely the rules that are accepted by the entities governing the first blockchain, with such rules being part of the ongoing rules of either the first and/or second blockchain, or distinct from the first and/or second blockchain operating rules.

Figure 16:
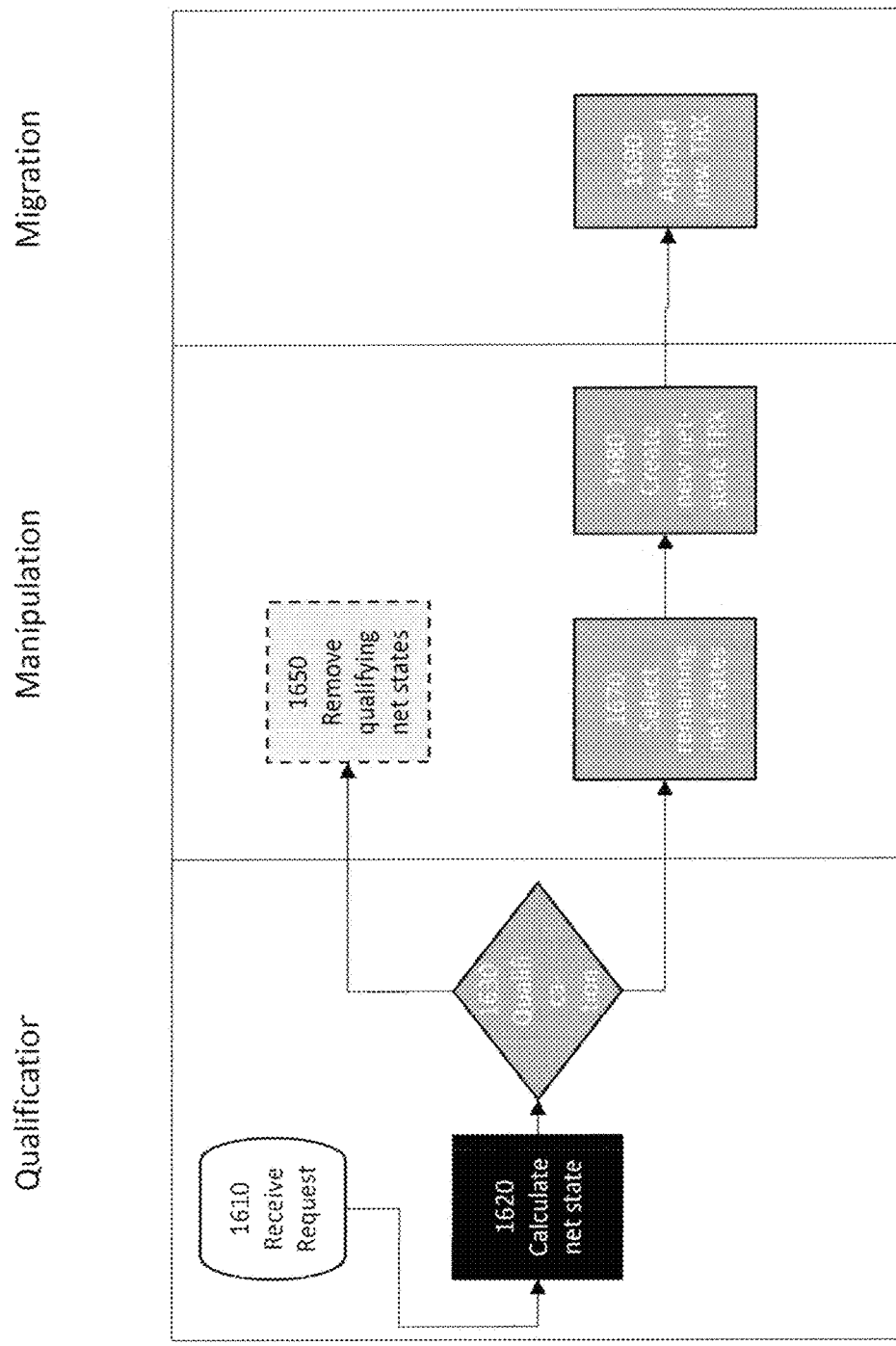
FIG. 16 is an illustrative flow chart showing the transformation of selected net states from a first blockchain into new transactions to be appended to a second blockchain.

An embodiment of the present methods and systems facilitates routine erasure of such PII, as well as any other data that warrants paring or removal. As shown in FIG. 16, in one embodiment, the system may first receive a request to remove data 1610 from a first blockchain. Depending on the nature and content of the blockchain, this request may only require removing name and contact information from a mailing list. However, such request may also require removal of an entire transaction history of one or more persons from the blockchain. Accordingly, the request need not be limited to requests to remove PII of one or more individuals. The same described process may also apply to the removal of other information including company information, transaction information, pricing information, photographs, and other similar data and information.

It is relevant to note that the requestor of data removal needs to be authorized according to the rules of the first blockchain. For example, the request may come from an individual requesting removal of his PII. Alternatively, such request may come from a company, other legal entity, an informal entity such as a group or club with no legal standing, or in certain circumstances a governmental entity. The information being requested for removal may be PII, or in other embodiments, the removal may be entity names, contact information, addresses, transaction dates, transaction values, items transacted, and any type of data or information that may be stored on the blockchain. The authorization of the requestor and the content of the information requested to be removed is dependent upon the rules for operation and management of the first blockchain.

Upon receiving a request to remove information from a first blockchain (1610), the system may undertake procedures and/or tests native to the blockchain, according to the blockchain rules, to initially ensure the person or entity requesting removal from the blockchain is authorized to make such a request.

The system next determines the characteristics of the transactions that have been requested to be removed and defines at least one set of transactions for removal. The set is determined to be inclusive of all transactions subject to the request, at a minimum. If the request is to remove an account ID, then the transactions will be grouped by account ID. Because more than one account ID may exist in any transaction, particular transactions may fall into multiple sets. There may be more than one request. In such a case, multiple sets of transactions may be defined, and these sets need not be mutually exclusive.

The system then calculates a net state of each of the various sets of the transactions from the first blockchain (1620). In the example where an account ID is included in more than one set, a net state may be calculated for each set for which it is a member. The net states may then be qualified based on the blockchain rules, for removal or for propagation of the information to a second blockchain (1630). For example, the rules may provide that all net states with a zero balance be removed from the set of net states to be migrated to the second blockchain. The rules may also provide for the removal of all net states in which an authorized requester has requested removal, as described above.

The rules may also provide for the removal of net states based upon other selection criteria including having a common or related transacting party, type of transaction, type of asset, quantity of asset, related to at least one smart contract, one or more smart contracts themselves, or any other features embodied in the transaction format, or any combination of such features. The rules may also include combinations of any or all of these criteria. These two examples of rules and conditions are exemplary of various other conditions that may be used to provide for net state selection or de-selection from the group of transactions to be removed. All such other conditions are within the scope of the present disclosed methods and systems. In an alternative embodiment, steps 1620 and 1630 may be reversed, with the qualification 1630 operating prior to the net state calculation 1620.

The system may scan the blockchain records, identifying all records (i.e., transactions) that contain the information to be removed. Through such identification, the system determines and retains the net state of those transactions that have not been selected for removal, identified as the "remaining transactions."

In some embodiments, upon determination of the net state, the identified transactions may be evaluated to determine if they pass a blockchain integrity test. That is, the system checks to ensure that if the identified net states/records/transactions are removed from the blockchain, there will not be remaining balances left unaccounted for that may have consequences for any of other remaining transactions. Potentially, this test may be performed by inspecting the net state to determine if the subject transactions are represented in the net state. In the case where the information being removed from an address list is a name and contact information, the removal of the name will not impact the integrity of the net state. However, in a blockchain tracking an asset such as a cryptocurrency, if the entity being removed from the blockchain (e.g., a person and his identifying information) still retains ownership of a set number of cryptocurrency tokens (X tokens), removing all records of the entity could destroy the integrity of the net state because the X tokens are not accounted for as being owned by any entity. In such cases, the integrity imbalance might be resolved by "burning" the remaining tokens, or destroying the record of the tokens.

Alternative resolutions of this issue could require the entity to sell its remaining cryptocurrency (X tokens) so that the entity no longer has a balance on the blockchain, that all such balances be sent to a general account number from which they may be irretrievable by anyone, or that the entity merely relinquish ownership of its X tokens, which results in the tokens to be lost in the same way that they may be lost if the owner loses his account ID. Upon resolving this imbalance and complying with the integrity test, the entity may then renew its request for removal. Alternatively, in another embodiment, the request may be retained in a "submitted" state and automatically be retested at each new time period in which the removal process is triggered. If the request is unresolved after the integrity test, the request for removal may be held in abeyance, pending later retesting and potential resolution.

In another embodiment, if the selected records violate the net state requirement or fail to meet another form of an integrity test, the system may create anti-blocks as necessary to address the change to the blockchain record caused through the removal entries from the net state.

As shown in FIG. 16, upon meeting the net state, integrity, and/or qualification review, the net states that qualify for removal may then be removed 1650. Net states that do not qualify for removal may be retained 1670 in the stored net states. These net states may then be processed 1680 into new transactions, as shown in FIG. 16, according to the rules which include ensuring the new transactions conform to the policies, procedures, format, and schema of the second blockchain. These new transactions are then sent to the second blockchain to be appended to the second blockchain 1690 according to the rules of the second blockchain.

Upon the removal of requested net states, in some embodiments the first blockchain file may then be archived. Depending on the charter of the blockchain and relevant legal mandates (e.g., for data retention and/or destruction), the archive may be stored (on-line or off-line) or destroyed.

In some embodiments, to accommodate ongoing requests for removal, the rules that trigger the archiving process could establish a regular (or irregular) schedule for performing this archiving operation. In other embodiments the processing may take place on-demand, when a certain number of requests for removal have been accrued, or when other defined conditions have been met.

Figure 17:
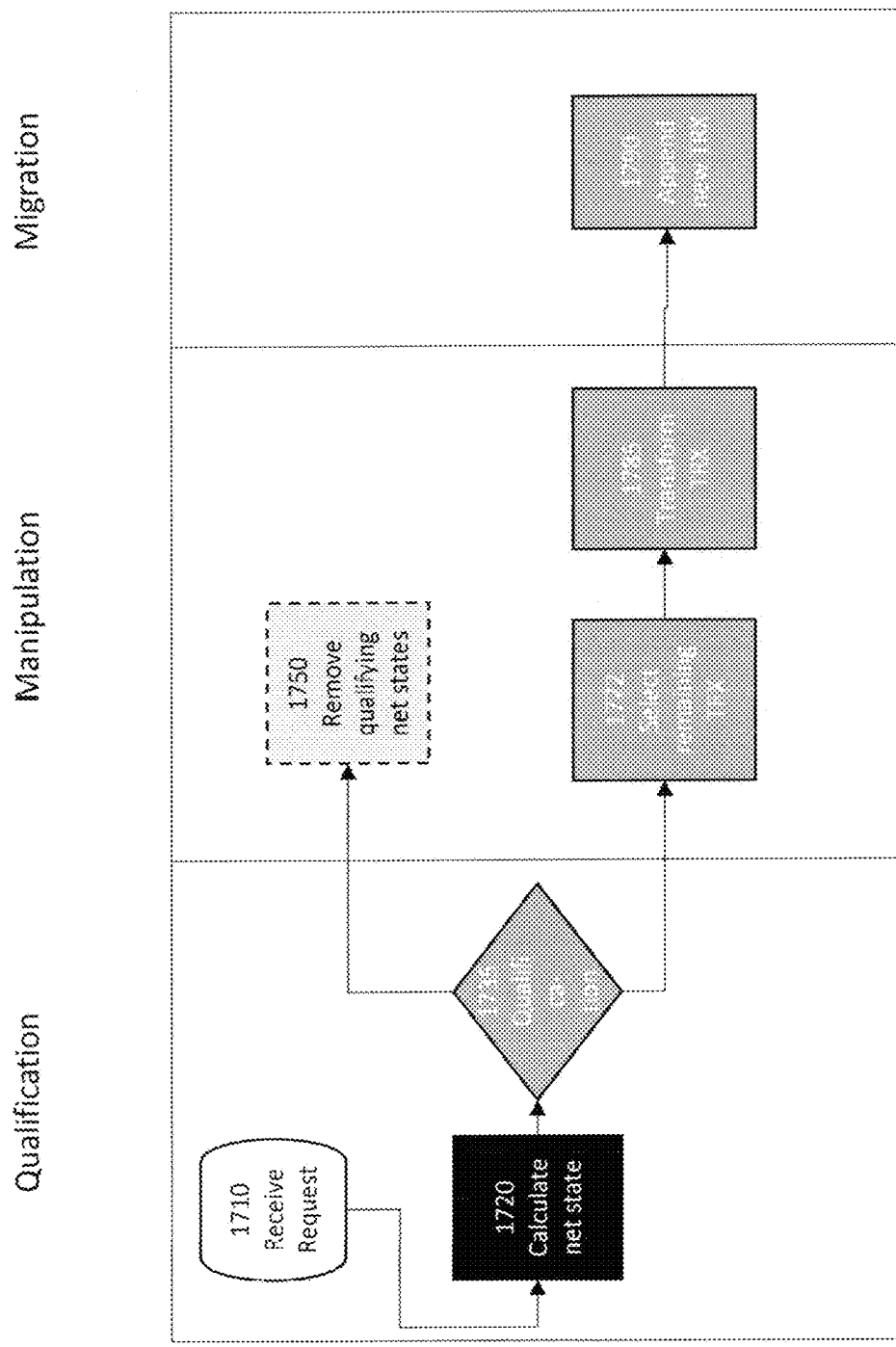
FIG. 17 is an illustrative flow chart showing the transformation of selected transactions from a first blockchain, based on the net states, into new transactions to be appended to a second blockchain.

In another embodiment of the disclosed methods and systems, as shown in FIG. 17, the entire transaction history—not just the net states, absent the transactions qualified for removal, as described above—are migrated to the second blockchain.

As shown in FIG. 17, upon receiving a request to remove information 1710 from a first blockchain, the system creates or calculates a net state of the sets of transactions 1720 from the first blockchain. The sets of transactions may be defined by such criteria as having a common or related transacting party, type of transaction, type of asset, quantity of asset, related to at least one smart contract, one or more smart contracts themselves, or any other features embodied in the transaction format, or any combination of such features.

While individual transactions may be isolated, such individual transactions could also populate or be members of multiple sets of transactions. For example, one set of transactions may include all transactions made by Account 447. Another set may include all transactions involving the sale of handbags. If Account 447 bought a handbag, that transaction would be part of both the set of transactions for Account 447 and the set of transactions for sale of handbags. The sets of transactions themselves are then qualified for further processing 1735, based upon the criteria for selection established in the rules. In some embodiments, these selection criteria include the net state balances of the sets of transactions, the request for removal, the type of transaction, the type of assets involved in the transactions, the amount of an asset included in the transaction, or any combination of these types of criteria. The above selection criteria are one set of criteria, and many other criteria may alternatively be used. The disclosed methods and systems are intended to operate with most all selection criteria.

As shown in FIG. 17, the sets of transactions that qualify for removal are removed from the stored transaction history 1750. The remaining transactions are identified or selected 1772, and are then transformed 1785 for migration to the second blockchain according to the rules. These rules may include conformance to the policy procedures, format, and schema of the second blockchain. These new transformed transactions are then sent to the second blockchain to be appended to the second blockchain 1790 according to the rules of the second blockchain. If the format or schema of the second blockchain is the same as that of the first blockchain, the transformation step 1785 may not be necessary, and transactions may be forwarded to the second blockchain to be appended. As described above, after the removal, transformation, and appending steps, the first blockchain may be archived or destroyed depending on the rules and the laws to which the first blockchain is subject.

There are certain scenarios where merely removing selected transactions may create a break in the integrity of the blockchain. An illustration of this includes two transactions. In the first transaction, Alice transfers 5 tokens to Bob. In the second transaction, Bob transfers all 5 tokens to Carol. If Bob then requests removal of his transaction history, the set of transactions identified for removal would include both of these transactions. The net state of Bob's account (the set of transactions) would be zero, but removing the set of transactions that involve Bob from the blockchain would corrupt the integrity of the blockchain for Alice and Carol. More particularly, without the first transaction, Alice would still have the 5 tokens she transferred to Bob; and without the second transaction, Carol would no longer have the 5 tokens that she received from Bob.

The disclosed methods and systems provide a means to address this integrity or imbalance issue, using rules that define several different approaches. In one embodiment, the rules might require the creation of an anti-transaction that would fill the void created by the removal of these transactions. More specifically, an anti-transaction may replace the two removed transactions with a new single transaction that showed Alice gave the tokens directly to Carol. The type of substitute transaction may also include a flag in its format. The flag might indicate, for example, that the transaction is an anti-transaction, and that Alice did not directly transfer tokens to Carol—that there was an intermediary who was removed, according to the rules. In such a case, the new anti-transactions would be added to the remaining transactions that may or may not need to be transformed 1785 before being transmitted for appending 1790 to the second blockchain. Where a timestamp is required for each transaction, the timestamp for the anti-transaction may be the same as the first transaction (Alice to Bob), the second transaction (Bob to Carol), or some other time as determined by the rules, including that the timestamp could provide a form of the flag information noted above. Two or more timestamps may also be provided, subject to the limitations of the transaction format or schema of the second blockchain.

In another embodiment, an anti-transaction may be created for each transaction that has been removed. For example, an anti-transaction may be created that transfers Alice's 5 tokens to one or more special accounts. These accounts may be established to support the anti-transactions. Such an anti-transaction would transfer 5 tokens from Alice to the special account. Similarly, a separate anti-transaction may be established to transfer 5 tokens from a special account to Carol.

Figure 18:
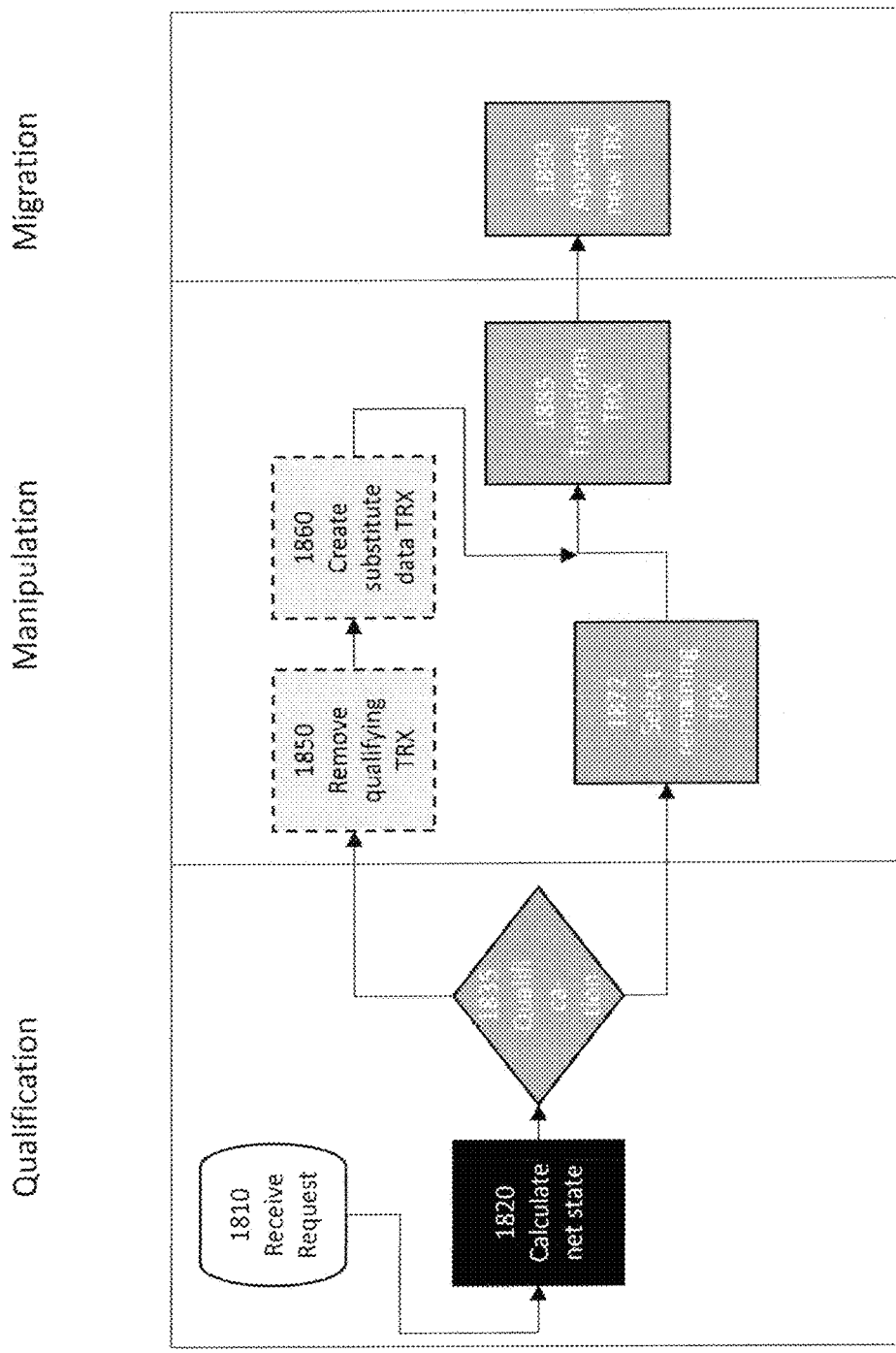
FIG. 18 is an illustrative flow chart showing the transformation of selected transactions from a first blockchain, based on the net states, into new transactions having substituted values in certain fields before the new transactions are combined with other non-selected transactions and then transformed into new transactions to be appended to a second blockchain.

In still further embodiments of the disclosed methods and systems, FIG. 18 depicts embodiments where, rather than removing the transactions entirely from the transactions migrated to the new blockchain, certain data in the to-be-removed transactions are either transformed in order to remove or obfuscate the information that has been requested to be removed or obfuscated.

More particularly, upon receiving a request to remove or conceal information stored in a first blockchain 1810, the system creates or calculates a net state of the sets of transactions of interest 1820 from the first blockchain. The sets of transactions are then qualified for further processing 1835, based upon the criteria for selection established in the rules.

Sets of transactions that qualify for data removal or obfuscation may be removed or segregated from the stored transaction history 1850. Alternatively, the sets of transactions that qualify for data removal or obfuscation may be processed in their current stored locations. Where the sets of transactions are removed or segregated, the sets of transactions that are not to removed, the "remaining transactions" continue 1872, at this step, unaltered as shown in FIG. 18.

In order to remove or obfuscate some or all of the data requested to be removed or obfuscated, substitute values may be created and used 1860 to replace the information in the fields of the blockchain transaction that are to be removed or obfuscated. In some embodiments, the values may merely be removed altogether. In some embodiments the values may be simply overwritten with other values. These values may be the same for every transaction processed (e.g., "xxx") or be comprised of algorithmically derived data unrelated to the original contents (e.g., "12345", "67890", or "abcde"). In another embodiment, all account information to be removed from the first blockchain may be replaced by a common set of values (e.g., a single account name). This would successfully obfuscate the identity of the original account, but also leave an indicator that the account history was changed.

As described, the information to be removed or obfuscated may be provided in select fields within each transaction. That is, there may be a "name" field, an "asset type" field, an "account owner" field, and so on. The rules for selecting the particular fields of information to be removed or obfuscated may accordingly include these types of field identifiers. Such identifiers may include one or more of account owner, asset type, asset quantity, transaction type, or any other identifier such that the transaction can be traced back to at least one entity who is seeking removal of such information.

The resulting transactions, now having the substitute data are then combined (if they have been segregated) with the remaining transactions as shown in FIG. 18. Where the removed transactions are altered or substitute without segregation, as described above, this "combining" step is not required. The resulting set of transactions including both the transactions that have been obfuscated with substitute values and those that remain unaltered, may then be transformed 1885 into transactions that conform to the second blockchain. These conformed transactions are then directed to, and appended to 1890, the second blockchain.

The first or parent blockchain may still retain the full records that existed prior to the various erasure processes described above. The operators or managers of the parent blockchain (which may be an enterprise, a government entity, or a group of public entities including a decentralized group of individuals) may then determine the fate of each first (parent) blockchain once the first blockchain has completed the process of having records removed. Such fate may be provided for within the rules for the first blockchain. Alternatively, it may be necessary to create new rules to cover the subsequent handling and/or operation of the first blockchain. Based on the goals of the blockchain, the laws applicable to data erasure and records retention, various measures may be taken including, encrypting the entire parent blockchain so that it can only be decrypted by particular parties, storing the first blockchain offline, or destroying the first blockchain—either immediately, or after an established retention period. Alternatively, one or more combinations of these approaches may also be undertaken.

While preferred embodiments of the inventive system, processes, and methodologies have been described and disclosed, in particular with reference to certain figures and exemplary embodiments for creating one or more second generation, or child blockchains that can remain "linked" to the parent blockchain, such exemplary representations are not to be construed as limiting the scope of application of the inventive methodologies or systems. By way of example, and as suggested herein, embodiments of the disclosed systems and methods could be revised to provide for multiple child blockchains directed to specific assets or transactions. Further, some of the illustrated spawning of child blockchains show a single or two parents being used to form a single or two children. However, and as described herein, the disclosed methodology is equally effective with three or more parent blockchains being used to create one, two, three, or more child blockchains. In addition, using varied embodiments of the disclosed methodologies and systems, the content of entire blockchains, selected transactions from particular blockchains, or combinations of entire blockchains and selected transactions from separate blockchains can be migrated to existing "child" blockchains. More particularly, using the disclosed methodologies and systems is not limited to initiating child blockchains from scratch. Moreover, the use of the blockchains described and to which the disclosed systems and methods may be applied, may include transactions involving any combination of tangible assets, intangible assets, actions, or other items that need to be logged.

It will be recognized by those skilled in the art that other modifications, substitutions, and/or other applications are possible and such modifications, substitutions, and applications are within the true scope and spirit of the present invention. It is likewise understood that the attached claims are intended to cover all such modifications, substitutions, and/or applications.

What is claimed is:

1. A computer-implemented method for extending utility of at least one information-technology blockchain, said method comprising the steps of:
   a. Storing, by at least one of a plurality of compute devices, rules in a computer memory;
   b. Monitoring, by at least one of said plurality of compute devices, a first blockchain, according to the rules;
   c. Selecting or creating, by at least one of said plurality of compute devices, a second blockchain, according to the rules;
   d. Storing, by at least one of said plurality of compute devices, a current state of all transactions in said first blockchain;
   e. Selecting, by at least one of said plurality of compute devices, at least one set of said stored transactions ("Selected Transactions"), according to the rules;
   f. Calculating, by at least one of said plurality of compute devices, a net state for each of said selected at least one set of transactions in the first blockchain, according to the rules;
   g. Storing, by at least one of said plurality of compute devices, said calculated net states;
   h. Processing all Selected Transactions, wherein said processing comprises at least one of steps A(i through iv), B(i through iv), C(i through vi), and D(i through v):
   A(i) Removing from said stored net states, at least one net state, based upon the rules;
   A(ii) Storing, by at least one of said plurality of compute devices, all non-removed net states ("Remaining Net States");
   A(iii) Creating, by at least one of said plurality of compute devices, at least one set of transactions relating to said Remaining Net States; and
   A(iv) Appending, by said second blockchain, to said second blockchain, said at least one set of transactions relating to said Remaining Net States; and
   B(i) Identifying, by at least one of said plurality of compute devices, at least one set of transactions from said stored sets of transactions, based upon the net state of said stored sets of transactions and the rules;
   B(ii) Removing, by at least one of said plurality of compute devices, said identified at least one set of transactions from said stored sets of transactions, based upon the net state of said stored sets of transactions and the rules;
   B(iii) Creating, by at least one of said plurality of compute devices, at least one set of transactions relating to all non-removed transactions ("Remaining Transactions"), according to the rules; and
   B(iv) Appending to said second blockchain, by said second blockchain, said Remaining Transactions, according to the rules; and
   C(i) Identifying, by at least one of said plurality of compute devices, at least one set of transactions from said stored sets of transactions, based upon the net states of said stored sets of transactions and the rules;
   C(ii) Removing, by at least one of said plurality of compute devices, said identified at least one set of transactions from said stored sets of transactions, based upon the net state of said stored sets of transactions and the rules ("Removed Transactions");

C(iii) Generating, by at least one of said plurality of compute devices, at least one anti-transactions comprising transactions that negate the removal of said removed transactions according to the rules, wherein said anti-transactions are generated by
  a. evaluating data values in each field of at least one of said Removed Transactions, according to the rules;
  b. creating at least one anti-transaction to compensate for information within said Removed Transactions, according to the rules; and
C(iv) Combining, by at least one of said plurality of compute devices, said at least one anti-transaction with all non-removed transactions ("Combined Transactions");
C(v) Creating, by at least one of said plurality of compute devices, at least one set of transactions relating to said Combined Transactions; and
C(vi) Appending to said second blockchain, by said second blockchain, said at least one set of transactions relating to said Combined Transactions; and
D(i) Identifying, by at least one of said plurality of compute devices, at least one set of transactions from said stored sets of transactions, based upon the net state of said stored sets of transactions and the rules;
D(ii) Substituting, by at least one of said plurality of compute devices, values in at least one selected field in said identified transactions with an alternative value ("Modified Transactions"), based upon the rules;
D(iii) Combining, by at least one of said plurality of compute devices, said Modified Transactions with all non-Modified Transactions ("Merged Transactions");
D(iv) Creating, by at least one of said plurality of compute devices, at least one set of transactions based on said Merged Transactions, according to the rules; and
D(v) Appending, by said second blockchain, said at least one set of transactions based on said Merged Transactions, to the second blockchain, according to the rules;
i. Receiving, by at least one of said plurality of compute devices, after calculation of said net states, subsequent transactions to be redirected to the second blockchain ("after-transactions"), according to the rules; and
j. Redirecting, by at least one of said plurality of compute devices, said after-transactions to the second blockchain according to the rules.

2. The computer-implemented method for extending utility of at least one information-technology blockchain of claim 1, wherein the rules for identifying said at least one account are at least one of:
  i. the net state of an identified account is zero; and
  ii. the owner of an identified account requested said account processing.

3. The computer-implemented method for extending utility of at least one information-technology blockchain of claim 1, wherein the rules for selecting fields, include at least one of:
  i. an identifier of an account owner;
  ii. an asset type;
  iii. an asset quantity;
  iv. a transaction type; and
  v. identifiers allowing said transaction to be traced back to at least one entity.

4. The computer-implemented method for extending utility of at least one information-technology blockchain, as disclosed in claim 1, wherein said at least one of a plurality of compute devices are unitary.

5. The computer-implemented method for extending utility of at least one information-technology blockchain, as disclosed in claim 1, further comprising the step of: archiving said first blockchain, after said at least one set of transactions are appended to the second blockchain according to the rules.

6. The computer-implemented method for extending utility of at least one source information-technology blockchain, as disclosed in claim 1, wherein all calculated net states or transactions in said first blockchain are selected.

7. The computer-implemented method for extending utility of at least one information-technology blockchain, as disclosed in claim 1, further comprising the step of archiving said first blockchain.

8. The computer-implemented method for extending utility of at least one information-technology blockchain, as disclosed in claim 1, wherein said second blockchain uses a blockchain policy, procedure, format, or schema distinct from a blockchain policy, procedure, format, or schema used by said first blockchain.

9. The computer-implemented method for extending utility of at least one information-technology blockchain, as disclosed in claim 1, wherein said rules for selecting calculated net states or transactions in the first blockchain include at least one of an asset type, a transaction date range, an account owner, a transaction type, a quantity, a jurisdiction, and an industry type.

10. A computing system, comprising a plurality of compute devices, for extending utility of at least one information-technology blockchain, comprising:
  a. a first plurality of compute devices to store and operate a first blockchain;
  b. a second plurality of compute devices to store and operate a second blockchain;
  c. at least one of a third plurality of compute devices executing a transformation protocol for:
    i. Storing, by at least one of a third plurality of compute devices, rules in a computer memory;
    ii. Monitoring, by at least one of said third plurality of compute devices, a first blockchain, according to the rules;
    iii. Selecting or creating, by at least one of said third plurality of compute devices, a second blockchain, according to the rules;
    iv. Storing, by at least one of said third plurality of compute devices, a current state of all transactions in said first blockchain;
    v. Selecting, by at least one of said third plurality of compute devices, at least one set of said stored transactions ("Selected Transactions"), according to the rules;
    vi. Calculating, by at least one of said third plurality of compute devices, a net state for each of said selected at least one set of transactions in the first blockchain, according to the rules;
    vii. Storing, by at least one of said third plurality of compute devices, said calculated net states;
    viii. Processing all Selected Transactions, wherein said processing comprises at least one of steps A(i through iv), B(i through iv), C(i through vi), and D(i through v):
      A(i) Removing from said stored net states, at least one net state, based upon the rules;

A(ii) Storing, by at least one of said third plurality of compute devices, all non-removed net states ("Remaining Net States");

A(iii) Creating, by at least one of said third plurality of compute devices, at least one set of transactions relating to said Remaining Net States; and A(iv) Appending, by said second blockchain, to said second blockchain, said at least one set of transactions relating to said Remaining Net States; and B(i) Identifying, by at least one of said third plurality of compute devices, at least one set of transactions from said stored sets of transactions, based upon the net state of said stored set of transactions and the rules;

B(ii) Removing, by at least one of said third plurality of compute devices, said identified at least one set of transactions from said stored sets of transactions, based upon the net state of said stored transactions and the rules;

B(iii) Creating, by at least one of said third plurality of compute devices, at least one set of transactions relating to all non-removed transactions ("Remaining Transactions"), according to the rules; and B(iv) Appending to said second blockchain, by said second blockchain, said Remaining Transactions, according to the rules; and C(i) Identifying, by at least one of said third plurality of compute devices, at least one set of transactions from said stored sets of transactions, based upon the net state of said stored sets of transactions and the rules;

C(ii) Removing, by at least one of said third plurality of compute devices, said identified at least one set of transactions from said stored sets of transactions, based upon the net state of said stored sets of transactions and the rules ("Removed Transactions");

C(iii) Generating, by at least one of said third plurality of compute devices, at least one anti-transactions comprising transactions that negate the removal of said removed transactions according to the rules, wherein said anti-transactions are generated by
  a. evaluating data values in each field of at least one of said Removed Transactions, according to the rules;
  b. creating at least one anti-transaction to compensate for information within said Removed Transactions, according to the rules; and C(iv) Combining, by at least one of said third plurality of compute devices, said at least one anti-transaction with all non-removed transactions ("Combined Transactions");

C(v) Creating, by at least one of said third plurality of compute devices, at least one set of transactions relating to said Combined Transactions; and C(vi) Appending to said second blockchain, by said second blockchain, said at least one set of transactions relating to said Combined Transactions; and D(i) Identifying, by at least one of said third plurality of compute devices, at least one set of transactions from said stored sets of transactions, based upon the net state of said stored sets of transactions and the rules;

D(ii) Substituting, by at least one of said third plurality of compute devices, values in at least one selected field in said identified sets of transactions with an alternative value ("Modified Transactions"), based upon the rules;

D(iii) Combining, by at least one of said third plurality of compute devices, said Modified Transactions with all non-Modified Transactions ("Merged Transactions")'

D(iv) Creating, by at least one of said third plurality of compute devices, at least one set of transactions based on said Merged Transactions, according to the rules; and D(v) Appending, by said second blockchain, said at least one set of transactions based on said Merged Transactions to the second blockchain, according to the rules;

ix. Receiving, by at least one of said third plurality of compute devices, after calculation of said net states, subsequent transactions to be redirected to the second blockchain ("after-transactions"), according to the rules; and x. Redirecting, by at least one of said third plurality of compute devices, said after-transactions to the second blockchain according to the rules.

11. The computer apparatus for extending utility of at least one information-technology blockchain, as disclosed in claim 10, wherein the rules for identifying said at least one account are at least one of:
   i. the net state of an identified account is zero; and
   ii. the owner of an identified account requested said account processing.

12. The computer apparatus for extending utility of at least one information-technology blockchain, as disclosed in claim 10, wherein the rules for selecting fields, include at least one of:
   i. an identifier of an account owner;
   ii. an asset type;
   iii. an asset quantity;
   iv. a transaction type; and
   v. identifiers allowing said transaction to be traced back to at least one entity.

13. The computing apparatus for extending utility of at least one information-technology blockchain, as disclosed in claim 10, wherein all transactions in said first blockchain are selected transactions.

14. The computing apparatus for extending utility of at least one information-technology blockchain, as disclosed in claim 10, further comprising archiving of said first blockchain after said redirecting of certain new transactions to said second blockchain.

15. The computing apparatus for extending utility of at least one information-technology blockchain, as disclosed in claim 10, further comprising creating at least one machine-readable link referring to one or more blocks in said first blockchain; and adding said at least one machine-readable link to at least one of said first set of transactions appended to said second blockchain.

16. The computing apparatus for extending utility of at least one information-technology blockchain, as disclosed in claim 10, wherein said second blockchain is a new blockchain.

17. The computing apparatus for extending utility of at least one information-technology blockchain, as disclosed in claim 10, wherein said second blockchain uses a blockchain policy or procedure distinct from a blockchain policy or procedure used by said first blockchain.

18. The computing apparatus for extending utility of at least one information-technology blockchain, as disclosed in claim 10, wherein said second blockchain uses an operating protocol distinct from an operating protocol used by said first blockchain.

19. The computing apparatus for extending utility of at least one information-technology blockchain, as disclosed in claim 10, wherein said first plurality and second plurality of compute devices are unitary.

20. The computing apparatus for extending utility of at least one information-technology blockchain, as disclosed in claim 10, further comprising the step of: archiving said first blockchain, after said first set of transactions are appended to the second blockchain according to the rules.

\* \* \* \* \*